(12) United States Patent
Yun

(10) Patent No.: US 10,795,614 B2
(45) Date of Patent: Oct. 6, 2020

(54) MEMORY CONTROLLER AND OPERATING METHOD THEREOF

(71) Applicant: SK hynix Inc., Gyeonggi-do (KR)

(72) Inventor: Ho Jung Yun, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 47 days.

(21) Appl. No.: 16/148,385

(22) Filed: Oct. 1, 2018

(65) Prior Publication Data

US 2019/0250858 A1 Aug. 15, 2019

(30) Foreign Application Priority Data

Feb. 14, 2018 (KR) .................... 10-2018-0018291

(51) Int. Cl.
*G06F 3/06* (2006.01)

(52) U.S. Cl.
CPC ............ *G06F 3/0673* (2013.01); *G06F 3/061* (2013.01); *G06F 3/0656* (2013.01)

(58) Field of Classification Search
CPC ........ G06F 3/06; G06F 3/0673; G06F 3/0688; G06F 3/061; G06F 3/0656; G06F 12/02; G06F 12/00; G06F 12/06; G06F 5/065; G06F 2205/064; G06F 2205/066
USPC .......................................................... 711/104
See application file for complete search history.

(56) References Cited

U.S. PATENT DOCUMENTS

| | | | | |
|---|---|---|---|---|
| 5,133,062 A * | 7/1992 | Joshi | ........................ | G06F 5/065 703/13 |
| 5,754,764 A * | 5/1998 | Davis | .................... | G06F 13/385 709/200 |
| 5,818,539 A * | 10/1998 | Naimpally | ................ | H04N 7/52 348/512 |
| 6,094,695 A * | 7/2000 | Kornher | .................. | G06F 5/065 710/56 |
| 6,473,818 B1 * | 10/2002 | Niu | ........................ | G06F 13/387 711/150 |
| 6,678,813 B1 * | 1/2004 | Le | ........................... | G06F 5/065 710/56 |
| 2007/0130401 A1 * | 6/2007 | Baker | .................... | G06F 13/102 710/62 |
| 2010/0057953 A1 * | 3/2010 | Kim | ....................... | G06F 13/409 710/52 |
| 2010/0165827 A1 * | 7/2010 | Kim | ....................... | H04W 16/14 370/201 |
| 2013/0013825 A1 * | 1/2013 | Muto | .................... | G06F 1/3206 710/56 |

(Continued)

FOREIGN PATENT DOCUMENTS

| KR | 100954904 | 4/2010 |
|---|---|---|
| KR | 1020160144577 | 12/2016 |

*Primary Examiner* — Mano Padmanabhan
*Assistant Examiner* — Jean C Edouard
(74) *Attorney, Agent, or Firm* — IP & T Group LLP

(57) ABSTRACT

In a memory controller for controlling an operation of a memory device, the memory controller includes a buffer memory and a buffer management circuit. The buffer memory includes an input buffer for storing input data received from a host and an output buffer for storing output data received from the memory device. The buffer management circuit changes capacities of the input buffer and the output buffer, based on a use state of at least one of the input buffer and the output buffer.

18 Claims, 14 Drawing Sheets

(56) References Cited

U.S. PATENT DOCUMENTS

2014/0068150 A1* 3/2014 Yun .................. G06F 3/0688
 711/103
2018/0232328 A1* 8/2018 Lassen ................ G06F 13/28

* cited by examiner

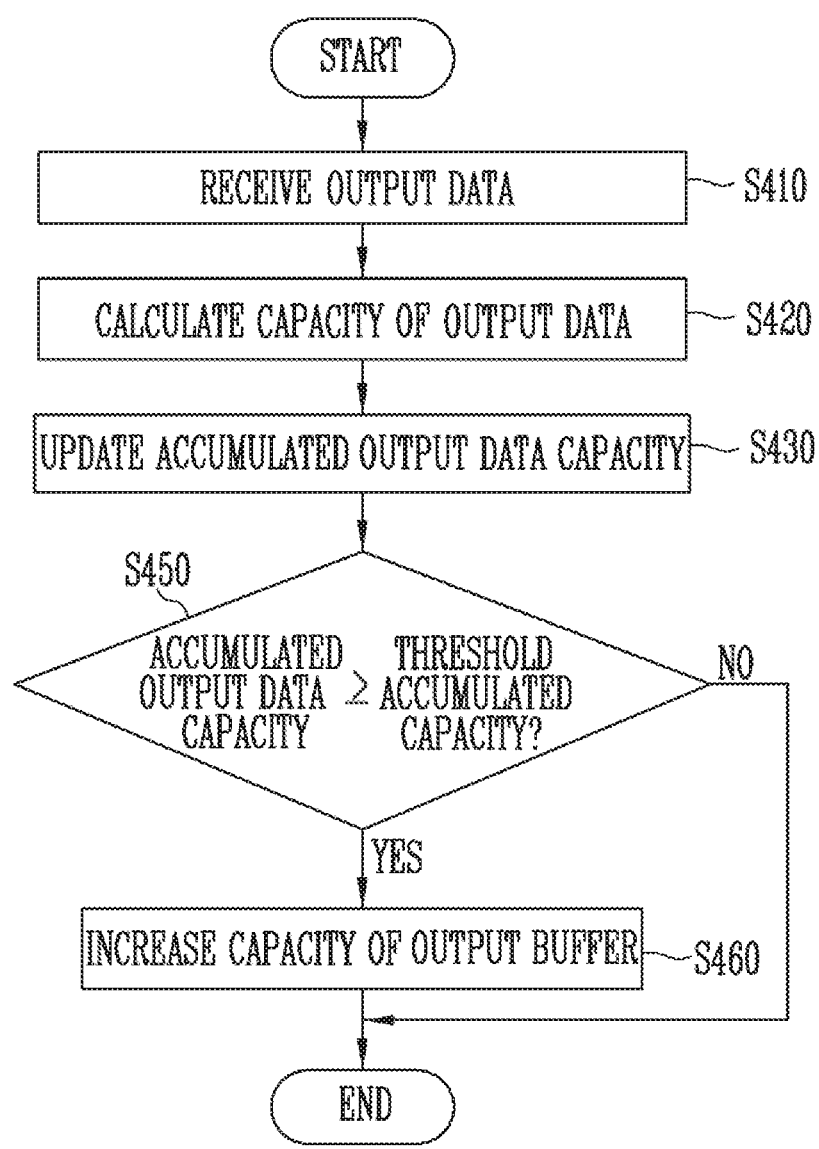

MEMORY CONTROLLER AND OPERATING METHOD THEREOF

CROSS-REFERENCE TO RELATED APPLICATION

The present application claims priority under 35 U.S.C. § 119(a) to Korean patent application number 10-2018-0018291, filed on Feb. 14, 2018, the entire disclosure of which is incorporated herein by reference in its entirety.

BACKGROUND

1. Field of Invention

Various embodiments of the present disclosure generally relate to an electronic device. Particularly, the embodiments relate to a memory controller and an operating method thereof.

2. Description of Related Art

Memory devices may be formed in a two-dimensional structure in which strings are arranged horizontally, or be formed in a three-dimensional structure in which strings are arranged vertically. A three-dimensional semiconductor device is a memory device used in order to overcome the limit of degree of integration in two-dimensional semiconductor devices, and may include a plurality of memory cells vertically stacked on a semiconductor substrate.

SUMMARY

Embodiments provide a memory controller capable of more efficiently utilizing a buffer memory.

Embodiments also provide an operating method of a memory controller capable of more efficiently utilizing a buffer memory.

According to an aspect of the present disclosure, there is provided a memory controller for controlling an operation of a memory device, the memory controller including: a buffer memory configured to include an input buffer for storing input data received from a host and an output buffer for storing output data received from the memory device; and a buffer management circuit configured to change capacities of the input buffer and the output buffer, based on a use state of at least one of the input buffer and the output buffer.

The buffer memory may be configured as an SRAM.

The input buffer and the output buffer may be divided by a buffer pointer indicating a specific address of the buffer memory. The buffer management circuit may change the capacities of the input buffer and the output buffer by changing the address indicated by the buffer pointer.

As the position indicated by the buffer pointer is changed, when the capacity of any one of the input buffer and the output buffer is increased, the capacity of the other of the input buffer and the output buffer may be decreased.

The buffer management circuit may include: a buffer monitoring section configured to output buffer analysis data according to usage of the buffer memory; a threshold value storing section configured to store a threshold value for changing the capacities of the input buffer and the output buffer; and a buffer capacity determining section configured to determine whether the capacities of the input buffer and the output buffer are to be changed by comparing the buffer analysis data and the threshold value.

The buffer analysis data may include a capacity of the input buffer, which is being currently used, and the threshold value may include a first threshold capacity of the input buffer. When the capacity of the input buffer, which is being currently used, is larger than or equal to the first threshold capacity, the buffer capacity determining section may determine that the capacity of the input buffer is to be increased.

The buffer analysis data may include a capacity of the output buffer, which is being currently used, and the threshold value may include a second threshold capacity of the output buffer. When the capacity of the output buffer, which is being currently used, is larger than or equal to the second threshold capacity, the buffer capacity determining section may determine that the capacity of the output buffer is to be increased.

The buffer analysis data may include a first count value that is a number where the capacity of the input buffer, which is being used, exceeds a predetermined first threshold capacity, and the threshold value may include a predetermined first threshold number of the input buffer. When the first count value measured during a predetermined first period is greater than or equal to the first threshold number, the buffer capacity determining section may determine that the capacity of the input buffer is to be increased.

The buffer analysis data may include a second count value that is a number where the capacity of the output buffer, which is being used, exceeds a predetermined second threshold capacity, and the threshold value may include a predetermined second threshold number of the output buffer. When the second count value measured during a predetermined first period is greater than or equal to the second threshold number, the buffer capacity determining section may determine that the capacity of the output buffer is to be increased.

The buffer analysis data may include a first count value that is a number where the capacity of the input buffer, which is being used, exceeds a predetermined first threshold capacity, and the threshold value may include a predetermined third threshold number of the input buffer. When the first count value measured during a predetermined first period is smaller than the third threshold number, the buffer capacity determining section may determine that the capacity of the input buffer is to be decreased.

The buffer analysis data may include a second count value that is a number where the capacity of the output buffer, which is being used, exceeds a predetermined second threshold capacity, and the threshold value may include a predetermined fourth threshold number of the output buffer. When the second count value measured during a predetermined first period is smaller than the fourth threshold number, the buffer capacity determining section may determine that the capacity of the output buffer is to be decreased.

The buffer analysis data may include a total capacity of data that have been stored in the input buffer, and the threshold value may include a predetermined threshold accumulated capacity of the input buffer. When the total capacity is larger than or equal to the threshold accumulated capacity, the buffer capacity determining section may determine that the capacity of the input buffer is to be increased.

The buffer monitoring section may update the total capacity whenever input data is stored in the input buffer.

The buffer analysis data may include a total capacity of data that have been stored in the output buffer, and the threshold value may include a predetermined threshold accumulated capacity of the output buffer. When the total capacity is larger than or equal to the threshold accumulated capacity, the buffer capacity determining section may determine that the capacity of the output buffer is to be increased.

Each of the input buffer and the output buffer may be implemented in the First-In-First-Out (FIFO) structure.

According to an aspect of the present disclosure, there is provided a method for operating a memory controller for controlling an operation of a memory device, the method including: checking use states of an input buffer and an output buffer of a buffer memory in the memory controller; and adjusting capacities of the input buffer and the output buffer, based on the use states.

The checking of the use states may include: checking a capacity of the input buffer, which is being currently used; and determining whether the capacity of the input buffer, which is being used, is larger than or equal to a predetermined first threshold capacity. In the adjusting of the capacities of the input buffer and the output buffer, the capacity of the input buffer may be increased when the capacity of the input buffer, which is being used, is larger than or equal to the first threshold capacity.

The increasing of the capacity of the input buffer may be performed by changing an address indicated by a buffer pointer for distinguishing the input buffer and the output buffer from each other.

The checking of the use states may include: checking a capacity of the output buffer, which is being currently used; and determining whether the capacity of the output buffer, which is being used, is larger than or equal to a predetermined second threshold capacity. In the adjusting of the capacities of the input buffer and the output buffer, the capacity of the output buffer may be increased when the capacity of the output buffer, which is being used, is larger than or equal to the second threshold capacity.

The checking of the use states may include: checking a first count value that is a number where the capacity of the input buffer, which is being used, exceeds a predetermined first threshold capacity; and determining whether the first count value is greater than or equal to a predetermined threshold number. In the adjusting of the capacities of the input buffer and the output buffer, the capacity of the input buffer may be increased when the first count value is greater than or equal to the first threshold number.

The checking of the use states may include: checking a second count value that is a number where the capacity of the output buffer, which is being used, exceeds a predetermined second threshold capacity; and determining whether the second count value is greater than or equal to a predetermined second threshold number. In the adjusting of the capacities of the input buffer and the output buffer, the capacity of the output buffer may be increased when the second count value is greater than or equal to the second threshold number.

The checking of the use states may include: checking a total input capacity that is the total capacity of data that have been stored in the input buffer; and determining whether the total input capacity is larger than or equal to a predetermined threshold accumulated capacity. In the adjusting of the capacities of the input buffer and the output buffer, the capacity of the input buffer may be increased when the total input capacity is larger than or equal to the threshold accumulated capacity.

The checking of the use states may include: checking a total output capacity that is the total capacity of data that have been stored in the output buffer; and determining whether the total output capacity is larger than or equal to a predetermined threshold accumulated capacity. In the adjusting of the capacities of the input buffer and the output buffer, the capacity of the output buffer may be increased when the total output capacity is larger than or equal to the threshold accumulated capacity.

According to an aspect of the present disclosure, there is provided a controller including: an input buffer for buffering inbound data; an output buffer for buffering outbound data; and a buffer management circuit configured to dynamically adjust sizes of the input and output buffers by allocating available size of one to the other one between the input and output buffers according to occupied sizes of one or more of the input and output buffers.

BRIEF DESCRIPTION OF THE DRAWINGS

Various embodiments will now be described in more detail hereinafter with reference to the accompanying drawings; however, elements and features of the present disclosure may be arranged or configured differently than shown or described herein. Thus, the present invention is not limited to the embodiments set forth herein. Rather, these embodiments are provided so that this disclosure is thorough and complete and fully conveys the scope of the embodiments to those skilled in the art. Throughout the specification, reference to "an embodiment" or the like is not necessarily to only one embodiment, and different references to "an embodiment" or the like are not necessarily to the same embodiment(s).

In the drawings, dimensions of the figures may be exaggerated for clarity of illustration. It will be understood that when an element is referred to as being "between" two elements, it can be the only element between the two elements, or one or more intervening elements may also be present. Like reference numerals refer to like elements throughout.

FIG. 15B is a flowchart illustrating an operating method of the memory controller according to still another embodiment of the present disclosure.

DETAILED DESCRIPTION

Figure 1:
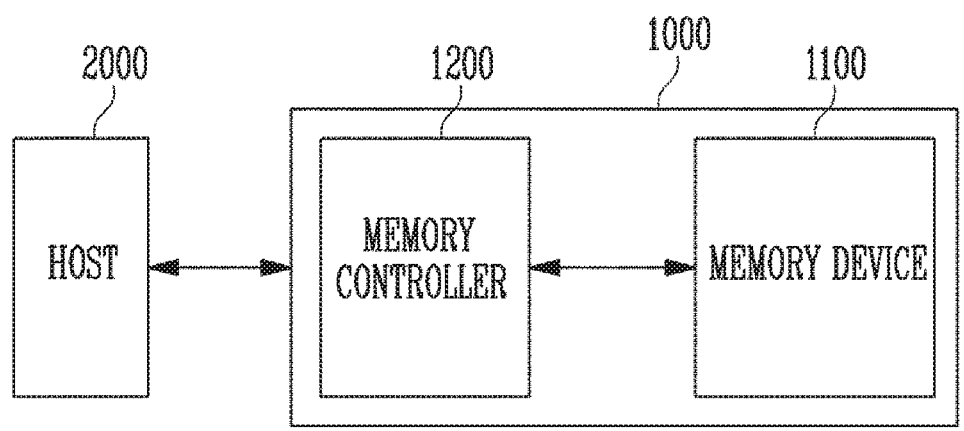
FIG. 1 is a diagram illustrating a memory system including a memory controller according to an embodiment of the present disclosure.

In the following detailed description, embodiments of the present disclosure are shown and described simply by way example. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed. In addition, when an element is referred to as "including" a component, this indicates that the element may further include one or more other components rather than excluding such other component(s) unless the context indicates otherwise.

The terminology used herein is for the purpose of describing particular embodiments only and is not intended to be limiting of the present invention.

As used herein, singular forms may include the plural forms as well and vice versa, unless the context clearly indicates otherwise.

Hereinafter, exemplary embodiments of the present disclosure will be described in detail with reference to the accompanying drawings. The same reference numerals are used to designate the same elements as those shown in other drawings. In the following descriptions, only portions necessary for understanding operations according to the exemplary embodiments may be described, and descriptions of the other portions may be omitted so as to not obscure important concepts of the embodiments.

FIG. 1 is a diagram illustrating a memory system including a memory controller according to an embodiment of the present disclosure.

Referring to FIG. 1, the memory system 1000 may include a memory device 1100 for storing data and a memory controller 1200 for controlling the memory device 1100 under the control of a host 2000.

The host 2000 may communicate with the memory system 1000 by using at least one of various interface protocols such as Peripheral Component Interconnect-Express (PCI-E), Advanced Technology Attachment (ATA), Serial ATA (SATA), Parallel ATA (PATA), or Serial Attached SCSI (SAS). Interface protocols between the host 2000 and the memory system 1000 are not limited to the above-described examples, and may be one of other interface protocols such as a Universal Serial Bus (USB), a Multi-Media Card (MMC), an Enhanced Small Disk Interface (ESDI), and Integrated Drive Electronics (IDE).

The memory controller 1200 may control the overall operations of the memory system 1000, and control data exchange between the host 2000 and the memory device 1100. For example, the memory controller 1200 may program or read data by controlling the memory device 1100 in response to a request from the host 2000. Also, the memory controller 1200 may store information of main memory blocks and sub-memory blocks, which are included in the memory device 1100, and select the memory device 1100 to perform a program operation on a main memory block or a sub-memory block according to the amount of data loaded for the program operation. Depending on an embodiment, the memory device 1100 may include, for example, a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), and a flash memory.

The memory device 1100 may perform a program, read or erase operation under the control of the memory controller 1200. A detailed configuration and operation of the memory device 1100 will be exemplarily described with reference to FIG. 2.

The memory controller 1200 according to the embodiment of the present disclosure may perform a test by sequentially popping and pushing commands stored in a command queue. Also, the memory controller 1200 may translate at least one of the commands stored in the command queue, based on the test result. Thus, the command queue of the memory controller 1200 may be more efficient. The memory controller 1200 according to the embodiment of the present disclosure will be described in more detail with reference to FIG. 3.

Figure 2:
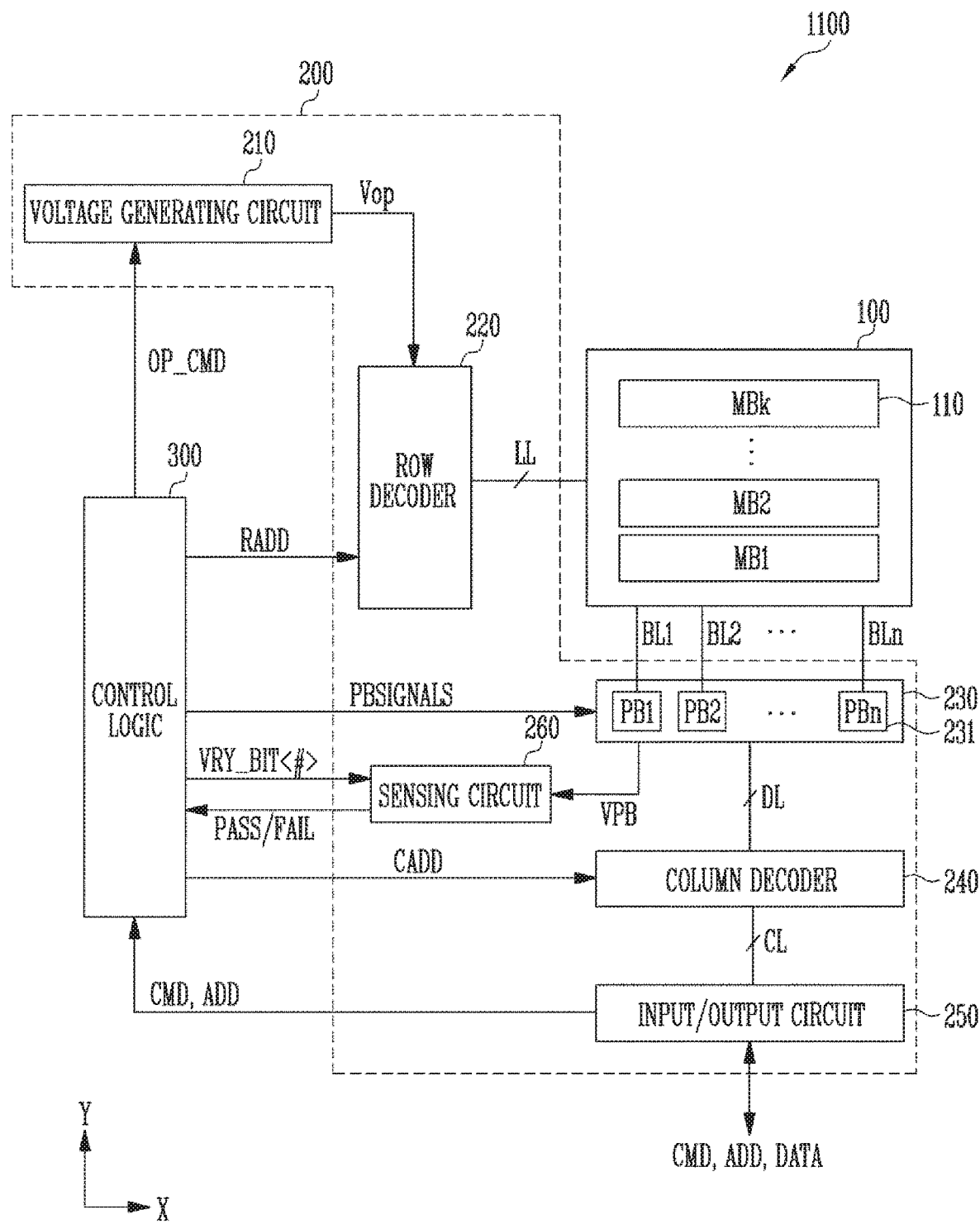
FIG. 2 is a diagram illustrating a memory device of FIG. 1.

FIG. 2 is a diagram illustrating the memory device of FIG. 1.

Referring to FIG. 2, the memory device 1100 may include a memory cell array 100 that stores data. The memory device 1100 may include peripheral circuit 200 configured to perform a program operation for storing data in the memory cell array 100, a read operation for outputting the stored data, and an erase operation for erasing the stored data. The memory device 1100 may include a control logic 300 that controls the peripheral circuit 200 under the control of the memory controller (1200 of FIG. 1).

The memory cell array 100 may include a plurality of memory blocks MB1 to MBk (k is a positive integer) 110. Local lines LL and bit lines BL1 to BLn (n is a positive integer) may be coupled to the memory blocks MB1 to MBk 110. For example, the local lines LL may include a first select line (not shown), a second select line (not shown), and a plurality of word lines (not shown) arranged between the first and second select lines. Also, the local lines LL may further include dummy lines (not shown) arranged to between the first select line and the word lines and between the second select line and the word lines. The first select line may be a source select line (not shown), and the second select line may be a drain select line (not shown). For example, the local lines LL may include word lines, drain and source select lines, and source lines SL. For example, the local lines LL may further include dummy lines. For example, the local lines LL may further include pipe lines (not shown). The local lines LL may be coupled to the memory blocks MB1 to MBk 110, respectively, and the bit lines BL1 to BLn may be commonly coupled to the memory blocks MB1 to MBk 110. The memory blocks MB1 to MBk 110 may be implemented in a two-dimensional or three-dimensional structure. For example, memory cells may be arranged in a direction parallel to a substrate in memory blocks 110 having a two-dimensional structure. For example, memory cells may be arranged in a direction vertical to a substrate in memory blocks 110 having a three-dimensional structure.

The peripheral circuit 200 may be configured to perform program, read, and erase operations of a selected memory block 110 under the control of the control logic 300. For example, the peripheral circuit 200, under the control of the control logic 300, may supply verify and pass voltages to the first select line, the second select line, and the word lines, selectively discharge the first select line, the second select line, and the word lines, and verify memory cells coupled a selected word line among the word lines. For example, the peripheral circuit 200 may include a voltage generating circuit 210, a row decoder 220, a page buffer group 230, a column decoder 240, an input/output circuit 250, and a sensing circuit 260.

The voltage generating circuit 210 may generate various operating voltages Vop used for program, read, and erase operations in response to an operation signal OP_CMD. Also, the voltage generating circuit 210 may selectively discharge the local lines LL in response to the operation signal OP_CMD. For example, the voltage generating circuit 210 may generate a program voltage, a verify voltage, pass voltages, a turn-on voltage, a read voltage, an erase voltage, a source line voltage, and the like under the control of the control logic 300.

The row decoder 220 may transfer the operating voltages Vop to local lines LL coupled to a selected memory block 110 in response to a row address RADD.

The page buffer group 230 may include a plurality of page buffers PB1 to PBn 231 coupled to the bit lines BL1 to BLn. The page buffers PB1 to PBn 231 may operate in response to page buffer control signals PBSIGNALS. For example, the page buffers PB1 to PBn 231 may temporarily store data received through the bit lines BL1 to BLn, or sense voltages or current of the bit lines BL1 to BLn in a read or verify operation.

The column decoder 240 may transfer data between the input/output circuit 250 and the page buffer group 230 in response to a column address CADD. For example, the column decoder 240 may exchange data with the page buffers 231 through data lines DL, or exchange data with the input/output circuit 250 through column lines CL.

The input/output circuit 250 may transfer a command CMD and an address ADD, which are received from the memory controller (1200 of FIG. 1), to the control logic 300, or communicate data DATA with the column decoder 240.

In a read operation or verify operation, the sensing circuit 260 may generate a reference current in response to a permission bit VRY_BIT<#>, and output a pass signal PASS or a fail signal FAIL by comparing a sensing voltage VPB received from the page buffer group 230 with a reference voltage generated by the reference current.

The control logic 300 may control the peripheral circuit 200 by outputting the operation signal OP_CMD, the row address RADD, the page buffer control signals PBSIGNALS, and the permission bit VRY_BIT<#> in response to the command CMD and the address ADD. Also, the control logic 300 may determine whether the verify operation has passed or failed in response to the pass or fail signal PASS or FAIL.

Figure 3:
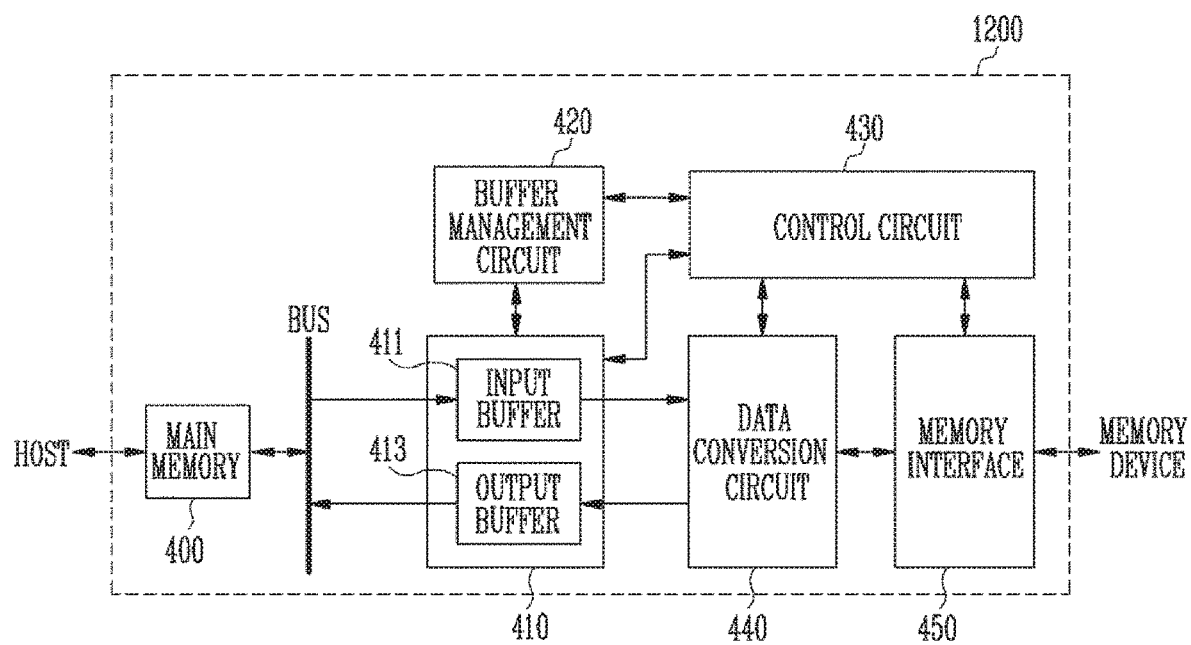
FIG. 3 is a block diagram illustrating a memory controller according to an embodiment of the present disclosure.

FIG. 3 is a block diagram illustrating the memory controller 1200 according to an embodiment of the present disclosure.

Referring to FIG. 3, the memory controller 1200 according to the embodiment of the present disclosure includes a main memory 400, a buffer memory 410, a buffer management circuit 420, a control circuit 430, a data conversion circuit 440, and a memory interface 450. The memory controller 1200 according to the embodiment of the present disclosure may further include other components in addition to the components shown in FIG. 3.

The main memory 400 may receive input data from the host 2000 and temporarily store the input data. Also, the main memory 400 may receive output data from the memory device 1100 and temporarily store the output data. Meanwhile, the main memory 400 may store the overall data necessary for an operation of the memory controller 1200. In an embodiment, the main memory 400 may be configured as a Dynamic Random Access Memory (DRAM).

In a general memory system, a host-side clock cycle may be different from a memory-device-side clock cycle. That is, as the host-side clock cycle is different from the memory-device-side clock cycle, a buffer memory for compensating for a speed difference caused by the difference in the clock cycles may be required. In FIG. 3, the main memory 400 may operate with the host-side clock cycle. Meanwhile, the data conversion circuit 440, the memory interface 450, and the like may operate with the memory-device-side clock cycle. Thus, the buffer memory 410 of the memory controller 1200 may compensate for a difference in speed between the main memory 400 operating at a relatively high speed with the host-side clock cycle and the data conversion circuit 440 operating at a relatively low speed with the memory-device-side clock cycle.

The main memory 400 may communicate with the buffer memory 410 through a bus BUS. Although not shown in detail in FIG. 3, the main memory 400 may also communicate with other components through the bus BUS. The main memory 400 may store input data received from the host 2000. Also, the main memory 400 may store output data received from the memory device 1100.

The buffer memory 410 may be coupled between the main memory 400 and the data conversion circuit 440. The buffer memory 410 may receive input data from the main memory 400. The input data is data transferred from the host 2000, and may be data to be written to the memory device 1100. The received input data may be temporarily stored in the buffer memory 410 and then transferred to the data conversion circuit 440. Subsequently, the input data may be transferred to the memory device 1100 through the memory interface 450.

Meanwhile, the buffer memory 410 may receive output data from the data conversion circuit 440. The output data may be data output from the memory device 1100 in response to a read command, etc. from the memory controller 1200. The output data is transferred from the memory device 1100 to the data conversion circuit 440 through the memory interface 450. The data conversion circuit 440 converts the received output data and transfers the converted output data to the buffer memory 410. The buffer memory 410 temporarily stores the output data and then transfers the output data to the main memory 400. The data transferred to the main memory 400 is output to the host.

The buffer memory 410 may include an input buffer 411 and an output buffer 413 to store the input data and the output data, respectively. The input buffer 411 temporarily stores input data transferred from the main memory 400. The output buffer 413 temporarily stores output data transferred from the data conversion circuit 440. Each of the input buffer 411 and the output buffer 413 may be implemented in the First-In-First-Out (FIFO) structure. Meanwhile, in an embodiment, the buffer memory 410, including the input buffer 411 and the output buffer 413, may be implemented with a Static RAM (SRAM).

Although FIG. 3 illustrates, by way of example, the input buffer 411 and the output buffer 413 separate from each other, the input buffer 411 and the output buffer 413 may be integrated. For example, the buffer memory 410 may be implemented with a single SRAM, and the input buffer 411 and the output buffer 413 may be implemented as memory areas logically divided in the single SRAM.

The buffer management circuit 420 may control an operation of the buffer memory 410. More specifically, the buffer management circuit 420 may dynamically adjust each capacity of the input buffer 411 and the output buffer 413 in the buffer memory 410. In an embodiment, the buffer management circuit 420 may adjust the capacities of the input buffer 411 and the output buffer 413 according to the usage of the input buffer 411 or the output buffer 413.

The control circuit 430 may control the overall operations of the memory controller 1200. In some embodiments, the control circuit 430 may control an operation of at least one of the main memory 400, the buffer memory 410, the buffer management circuit 420, the data conversion circuit 440, and the memory interface 450. In an embodiment, the controller 430 may be configured as a microcontroller.

The data conversion circuit 440 may receive input data from the buffer memory 410 and convert the input data. In an example, the data conversion circuit 440 may insert parity bits for ECC into the input data. In another example, the data conversion circuit 440 may randomize the input data. In addition, the data conversion circuit 440 may perform various functions of converting the input data into data to be actually written to the memory device by encoding the input data.

Meanwhile, the data conversion circuit 440 may inversely convert output data received from the memory device 1100. In an example, the data conversion circuit 440 may perform ECC on the output data. In another example, the data conversion circuit 440 may randomize the output data. In addition, the data conversion circuit 440 may perform various functions of converting the output data into data to be actually output to the host by decoding the output data.

The memory interface 450 may control data transfer between the memory controller 1200 and the memory device 1100.

The capacities of the input buffer 411 and the output buffer 413 may vary depending on usage of the memory system 1000. For example, when the memory system 1000 is applied to a camera or the like, a write operation of data is relatively frequently performed. When the capacity of the input buffer 411 is small, a bottleneck phenomenon may occur when data is transferred from the main memory 400 to the data conversion circuit 440. This results in a decrease in the total write speed of the memory system 1000. Thus, in this example, the input buffer 411 requires a relatively large capacity, and the output buffer 413 does not require a large capacity.

On the other hand, when the memory system 1000 is applied to a music player, for example, a read operation of data is relatively frequently performed. When the capacity of the output buffer 413 is small, a bottleneck phenomenon may occur when data is transferred from the data conversion circuit 440 to the main memory 400. This results in a decrease in the total read speed of the memory system 1000. Thus, in this example, the output buffer 413 requires a relatively large capacity, and the input buffer 411 does not require a large capacity.

The memory controller 1200 according to the embodiment of the present disclosure adjusts the capacities of the input buffer 411 and the output buffer 413 according to the usage of at least one of the input buffer 411 and the output buffer 413. Accordingly, the capacities of the input buffer 411 and the output buffer 413 in the buffer memory 410 are dynamically changed depending on the usage of the memory system 1000. Consequently, the throughput between the main memory 400 and the data conversion circuit 440 in the memory controller 1200 can be increased, and the total operation speed of the memory system 1000 can be increased.

Figure 4:
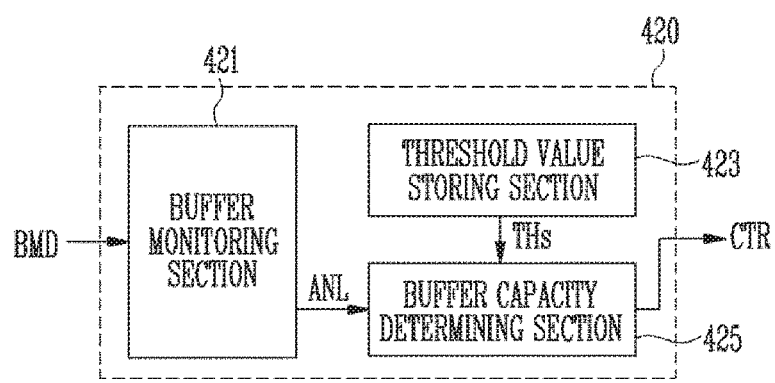
FIG. 4 is a block diagram illustrating an exemplary embodiment of a buffer management circuit shown in FIG. 3.

FIG. 4 is a block diagram illustrating an exemplary embodiment of the buffer management circuit 420 shown in FIG. 3.

Referring to FIG. 4, the buffer management circuit 420 may include a buffer monitoring section 421, a threshold value storing section 423, and a buffer capacity determining section 425.

The buffer monitoring section 421 receives buffer check data BMD indicating a use state of the buffer memory 410, and outputs buffer analysis data ANL, based on the buffer check data BMD. The threshold value storing section 423 stores threshold values THs for changing capacities of the input buffer 411 and the output buffer 413. The threshold values THs may be reference values compared with the buffer analysis data ANL to determine whether to adjust capacities of the input buffer 411 and the output buffer 413. The buffer capacity determining section 425 determines whether to adjust capacities of the input buffer 411 and the output buffer 413, by comparing the threshold values THs with the buffer analysis data ANL, and generates a control signal CTR, based on the determination result. The control signal CTR is transferred to the buffer memory 410. More specifically, the control signal CTR may be a signal for changing the address indicated by a buffer pointer for dividing the input buffer 411 and the output buffer 413 from each other. When the position indicated by the buffer pointer is changed, the capacities of the input buffer 411 and the output buffer 413 are changed. This will be described in more detail later with reference to FIG. 5.

Although FIGS. 3 and 4 illustrate, by way of example, that the buffer management section 420 is a component provided separately from the control circuit 430, the memory controller 1200 according to the embodiment of the present disclosure is not limited thereto. That is, the buffer management section 420 and the control circuit 430 may be integrated. The buffer management section 420 and the control circuit 430 may be configured as one microprocessor.

Figure 5:
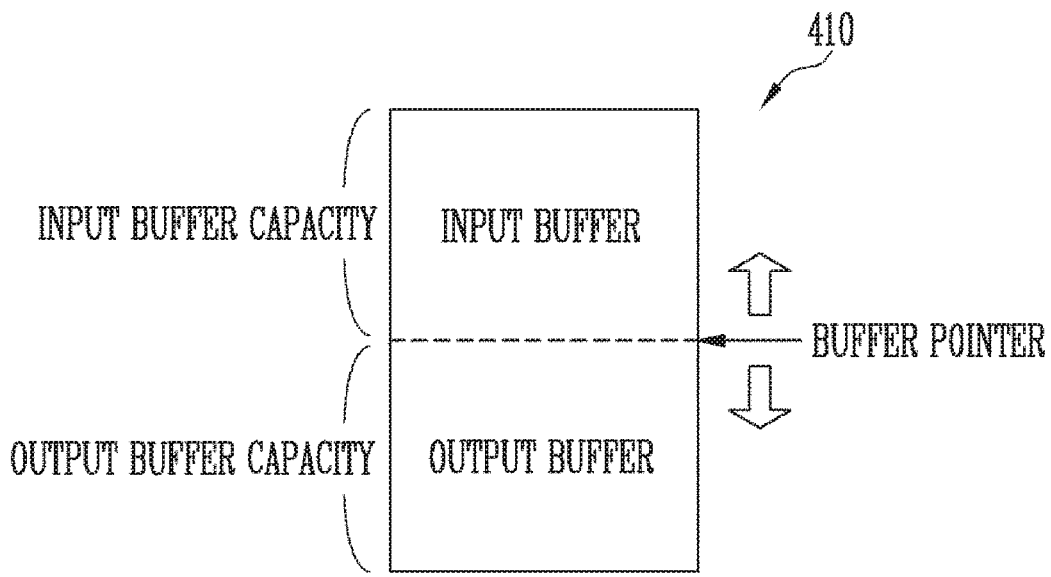
FIG. 5 is a block diagram schematically illustrating a buffer memory of FIG. 3.

FIG. 5 is a block diagram schematically illustrating a buffer memory 410 of FIG. 3.

Referring to FIG. 5, the buffer memory 410 includes the input buffer 411 and the output buffer 413. In the particular embodiment shown in FIG. 5, the input buffer 411 and the output buffer 413 are not configured separately from each other, but are configured as memory areas logically divided in the buffer memory 410. A buffer pointer indicating a specific address of the buffer memory 410 may logically divide the buffer memory 410 into the input buffer 411 and the output buffer 413. The buffer pointer may be a memory pointer indicating a logical address as a boundary between the input buffer 411 and the output buffer 413.

As the address indicated by the buffer pointer is changed, capacities of the input buffer 411 and the output buffer 413 may be changed. When the position indicated by the buffer pointer shown in FIG. 5 is moved upward, the capacity of the input buffer 411 may decrease, and the capacity of the output buffer 413 may increase. On the contrary, when the position indicated by the buffer pointer is moved downward, the capacity of the input buffer 411 may increase, and the capacity of the output buffer 413 may decrease.

In the memory controller 1200 according to the embodiment of the present disclosure, the address indicated by the buffer pointer is changed depending on use states of the input buffer 411 and the output buffer 413. Accordingly, the capacities of the input buffer 411 and the output buffer 413 can be changed dynamically. Consequently, the capacities of the input buffer 411 and the output buffer 413 are changed to adaptively depending on characteristics of a user, so that the throughput between the main memory 400 and the data conversion circuit 440 can be increased. Thus, the operation speed of the memory system 1000 can be increased.

Figure 6:
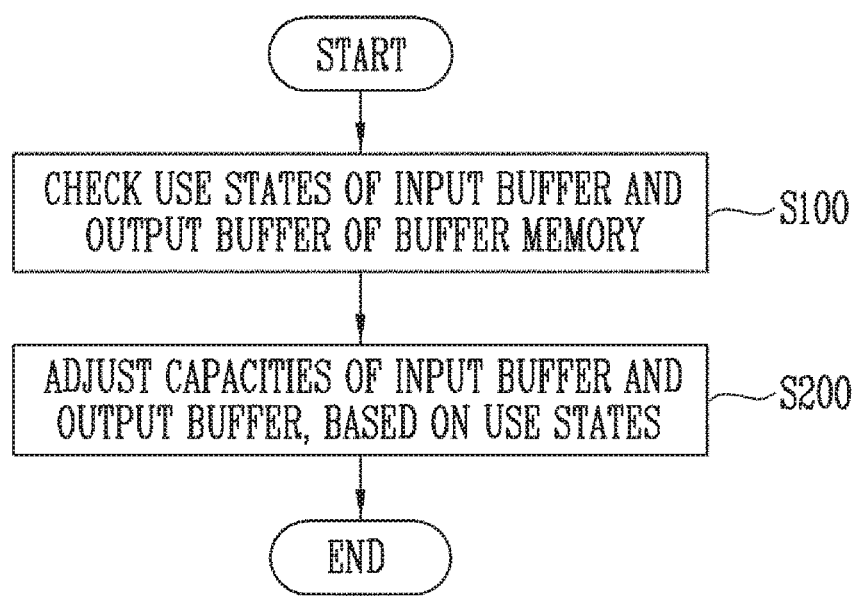
FIG. 6 is a flowchart illustrating an operating method of the memory controller according to an embodiment of the present disclosure.

FIG. 6 is a flowchart illustrating an operating method of the memory controller according to an embodiment of the present disclosure.

Referring to FIG. 6, the operating method of the memory controller 1200 according to the embodiment of the present disclosure includes a step S100 of checking use states of the input buffer 411 and the output buffer 413, and a step S200 of adjusting capacities of the input buffer 411 and the output buffer 413, based on the use states.

Exemplary embodiments of the steps S100 and S200 will be described in detail with reference to FIGS. 8A to 14.

Figure 7:
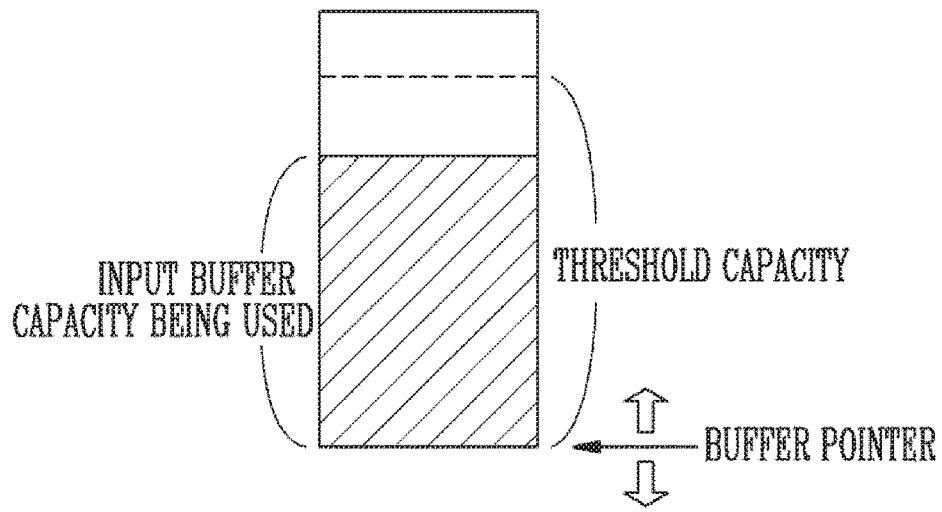
FIG. 7 is a diagram illustrating a threshold capacity of an input buffer.

FIG. 7 is a diagram illustrating a threshold capacity of the input buffer 411.

Referring to FIG. 7, for convenience of description, only the input buffer 411 of the buffer memory 410 is illustrated, and illustration of the output buffer 413 is omitted. However, it is to be noted that the buffer memory 410 also includes the output buffer 413, and the output buffer 413 is illustrated similar to the input buffer 411 of FIG. 7.

Referring to FIG. 7, an input buffer capacity being used among the total capacity of the input buffer 411 is represented by hatching. In addition, a threshold capacity is also represented in FIG. 7. The threshold capacity may be used as a reference value compared with the input buffer capacity being used to change the capacity of the input buffer 411.

When the memory system 1000 frequently performs a write operation of data depending on characteristics of a user, it is highly likely that the input buffer capacity being used by the input buffer 411 will increase. Therefore, a situation in which the input buffer capacity being used is larger than the threshold capacity may frequently occur. When the input buffer capacity being used is equal to the total capacity of the input buffer 411, input data cannot be stored in the input buffer 411. The storing of the input data in the input buffer 411 is delayed, and therefore, a data bottleneck phenomenon from the main memory 400 to the data conversion circuit 440 occurs.

Thus, when the input buffer capacity being used is larger than the threshold capacity or when the situation in which the input buffer capacity being used exceeds the threshold capacity frequently occurs, the capacity of the input buffer 411 is increased, so that the data bottleneck phenomenon can be prevented. Accordingly, the throughput from the main memory 400 to the data conversion circuit 440 is increased.

On the contrary, when the memory system 1000 frequently performs a read operation of data depending on the characteristics of the user, it is highly likely that an output buffer capacity being used by the output buffer 413 will increase. Therefore, a situation in which the output buffer capacity being used is larger than the threshold capacity may frequently occur. When the output buffer capacity being used is equal to the total capacity of the output buffer 413, output data cannot be stored in the output buffer 413. The storing of the output data in the output buffer 413 is delayed, and therefore, a data bottleneck phenomenon from the data conversion circuit 440 to the main memory 400 occurs.

Thus, when the output buffer capacity being used is larger than the threshold capacity or when the situation in which the output buffer capacity being used exceeds the threshold capacity frequently occurs, the capacity of the output buffer 413 is increased, so that the data bottleneck phenomenon can be prevented. Accordingly, the throughput from the data conversion circuit 440 to the main memory 400 is increased.

Figure 8A:
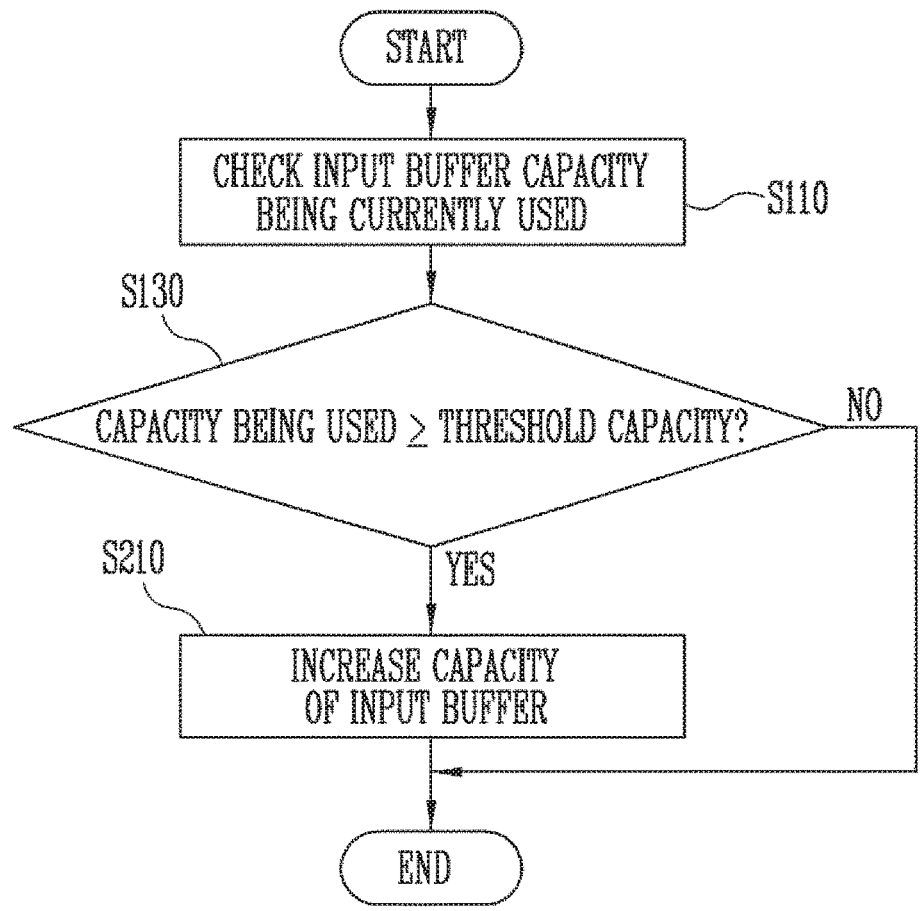
FIG. 8A is a flowchart illustrating an example of the operating method of the memory controller according to the present disclosure.
Figure 8B:
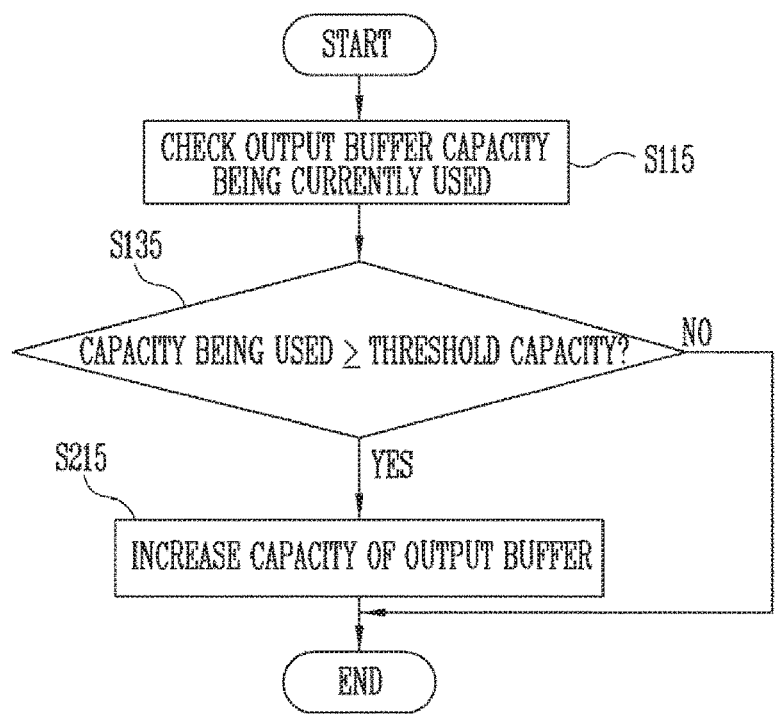
FIG. 8B is a flowchart illustrating another example of the operating method of the memory controller according to the present disclosure.

FIG. 8A is a flowchart illustrating an example of the operating method of the memory controller 1200 according to the present disclosure. FIG. 8B is a flowchart illustrating another example of the operating method of the memory controller 1200 according to the present disclosure. FIG. 8A illustrates an embodiment in which the capacity of the input buffer 411 is increased according to the usage of the input buffer 411, and FIG. 8B illustrates an embodiment in which the capacity of the output buffer 413 is increased according to the usage of the output buffer 413. Hereinafter, an operating method of the memory controller according to an exemplary embodiment of the present disclosure will be described with references to FIGS. 4, 8A, and 8B.

Referring to FIG. 8A, an operating method of the memory controller 1200 according to an exemplary embodiment of the present disclosure includes a step S110 of checking a capacity of the input buffer 411, which is being currently used, and a step S130 of determining whether the input buffer capacity being used is larger than or equal to a threshold capacity. The steps S110 and S130 may be steps included in the step S100 of FIG. 6.

The operating method of the memory controller according to the exemplary embodiment of the present disclosure further includes a step S210 of increasing the capacity of the input buffer 411 when the input buffer capacity being used is larger than or equal to the threshold capacity as a result of the step S130 (that is, "YES" at step S130). The step S210 may be a step included in the step S200 of FIG. 6. When the input buffer capacity being used is smaller than the threshold capacity as a result of the step S130 (that is, "NO" at step S130), the process ends without increasing the capacity of the input buffer.

Specifically, in the step S110, the input buffer capacity being currently used is transferred in the form of buffer check data BMD to the buffer monitoring section 421. The buffer monitoring section 421 transfers, as buffer analysis data ANL, the input buffer capacity being currently used, which is included in the buffer check data BMD, to the buffer capacity determining section 425.

In the step S130, the buffer capacity determining section 425 compares the input buffer capacity being currently used with the threshold capacity. The threshold value storing section 423 transfers the threshold capacity as a threshold value THs to the buffer capacity determining section 425. When the input buffer capacity being currently used is larger than or equal to the threshold capacity, the buffer capacity determining section 425 generates a control signal CTR for increasing the capacity of the input buffer 411 and transfers the control signal CTR to the buffer memory 410. The position indicated by the buffer pointer is changed in response to the control signal CTR, so that the capacity of the input buffer 411 increases.

When the input buffer capacity being currently used is smaller than the threshold capacity, the capacity of the input buffer 411 is not changed. Each of the steps S110, S130, and S210 shown in FIG. 8A may be periodically performed for every certain time interval. That is, the buffer management circuit 420 may periodically receive buffer check data BMD, and determine whether the capacity of the input buffer 411 is to be changed based on the buffer check data BMD.

Referring to FIG. 8B, an operating method of the memory controller 1200 according to an exemplary embodiment of the present disclosure includes a step S115 of checking a capacity of the output buffer 413, which is being currently used, and a step S135 of determining whether the output buffer capacity being used is larger than or equal to a threshold capacity. The steps S115 and S135 may be steps included in the step S100 of FIG. 6.

The operating method of the memory controller 1200 according to the exemplary embodiment of the present disclosure further includes a step S215 of increasing the capacity of the output buffer 413 when the output buffer capacity being used is larger than or equal to the threshold capacity as a result of the step S135 (that is, "YES" at step S135). The step S215 may be a step included in the step S200 of FIG. 6. When the output buffer capacity being used is smaller than the threshold capacity as a result of the step S135 (that is, "NO" at step S135), the process ends without increasing the capacity of the output buffer.

It will be understood that, as the steps S115, S135, and S215 are performed, the capacity of the output buffer 413 is changed similar to how the capacity of the input buffer 411 changed as described in FIG. 8A. Therefore, overlapping descriptions will be omitted.

Figure 9:
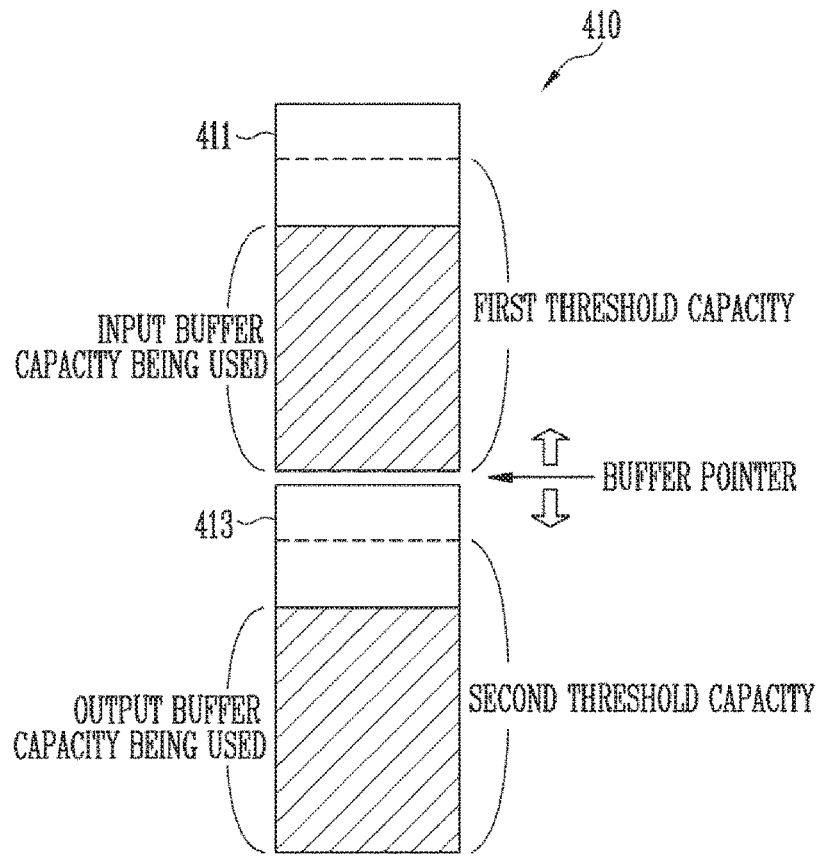
FIG. 9 is a block diagram illustrating threshold capacities of the input buffer and an output buffer.

FIG. 9 is a block diagram illustrating threshold capacities of the input buffer 411 and the output buffer 413.

Referring to FIG. 9, the input buffer 411 and the output buffer 413 in the buffer memory 410 are schematically illustrated. The input buffer 411 and the output buffer 413 are divided by a buffer pointer, and capacities of the input buffer 411 and the output buffer 413 may be changed when the position indicated by the buffer pointer is changed. Meanwhile, a first threshold capacity is determined in advance with respect to the input buffer 411, and a second threshold capacity is determined in advance with respect to the output buffer 413. The first threshold capacity and the second threshold capacity are the threshold values THs shown in FIG. 4, and may be stored in the threshold value storing section 423. Meanwhile, the first threshold capacity and the second threshold capacity may have the same value. However, the first threshold capacity and the second threshold capacity may have different values, if necessary.

In FIG. 9, an input buffer capacity being used is smaller than the first threshold capacity, and an output buffer capacity being used is smaller than the second threshold capacity. In this example, when the input buffer capacity being used exceeds the first threshold capacity, the capacity of the input buffer 411 can be increased as described with reference to FIG. 8A. This is because a sufficient space still exists in the output buffer 413.

However, unlike FIG. 9, when the input buffer capacity being used exceeds the first threshold capacity in a situation in which the output buffer capacity being used exceeds the second threshold capacity, the capacity of the output buffer 413 may be insufficient when the capacity of the input buffer 411 is increased. Thus, it is preferable that the capacity of the input buffer 411 is not increased. Hereinafter, an operating method of the controller, which reflects the above-described requirement, will be described with reference to FIG. 10.

Figure 10:
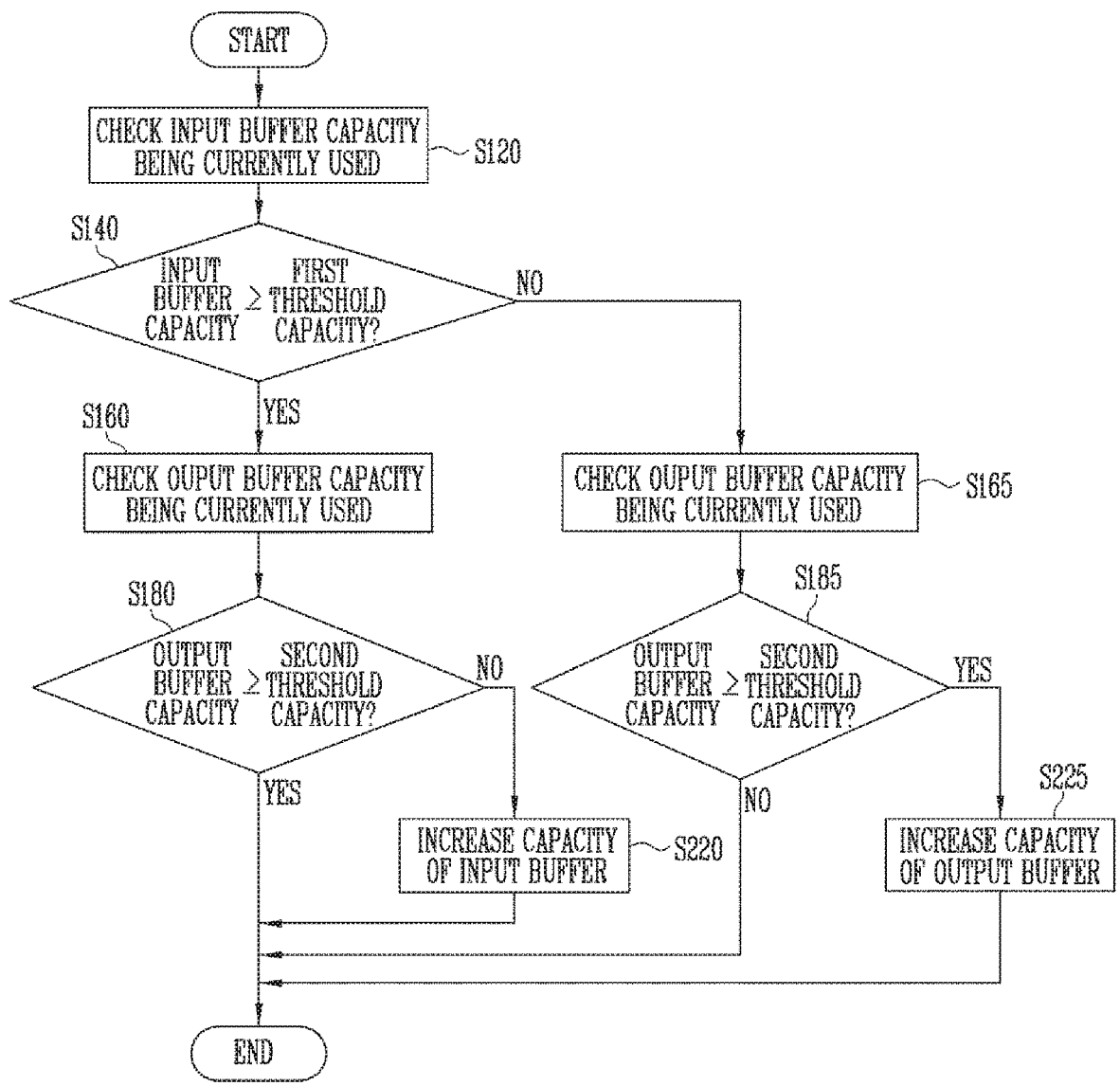
FIG. 10 is a flowchart illustrating an operating method of the memory controller according to another embodiment of the present disclosure.

FIG. 10 is a flowchart illustrating an operating method of the memory controller 1200 according to another embodiment of the present disclosure.

Referring to FIG. 10, an input buffer capacity being currently used is checked at step S120, and it is determined whether the input buffer capacity being used is larger than or equal to the first threshold capacity at step S140.

When the input buffer capacity being used is larger than or equal to the first threshold capacity (that is, "YES" at step S140), an output buffer capacity being currently used is checked at step S160, and it is determined whether the output buffer capacity is larger than or equal to the second threshold capacity at step S180.

When the output buffer capacity being used is larger than or equal to the second threshold capacity (that is, "YES" at step S180), the capacity of the output buffer 413 is not sufficient, and therefore, the process ends without increasing the capacity of the input buffer 411. When the output buffer capacity being used is smaller than the second threshold capacity (that is, "NO" at step S180), the capacity of the output buffer 413 is sufficient, and therefore, the capacity of the input buffer 411 is increased at step S220.

Meanwhile, when the input buffer capacity being used is smaller than the first threshold capacity as a result of the step S140 (that is, "NO" at step S140), this means that the capacity of the input buffer 411 is sufficient. Subsequently, the output buffer capacity being currently used is checked at step S165, and it is determined whether the output buffer capacity being used is larger than or equal to the second threshold capacity at step S185.

When the output buffer capacity being used is larger than or equal to the second threshold capacity in a situation in which the capacity of the input buffer 411 is sufficient (that is, "YES" at step S185), the capacity of the output buffer 413 is increased at step S225. When the output buffer capacity being used is smaller than the second threshold capacity (that is, "NO" at step S185), the process ends without increasing the capacity of the output buffer 413.

In FIG. 10, it will be understood that the steps S120, S140, S160, S165, S180, and S185 are included in the step S100 of FIG. 6, and the steps S220 and S225 are included in the step S200 of FIG. 6.

According to the embodiment shown in FIG. 10, although the capacity of the input buffer 411, which is being currently used, exceeds the first threshold capacity, it is determined whether the capacity of the input buffer 411 is to be increased according to whether the capacity of the output buffer 413 is sufficient. Meanwhile, when the capacity of the input buffer 411 is sufficient, the capacity of the output buffer 413 is increased when the capacity of the output buffer 413, which is being currently used, exceeds the second threshold capacity. Accordingly, the capacities of the input buffer 411 and the output buffer 413 can be changed by considering both use states of the input buffer 411 and the output buffer 413.

Figure 11A:
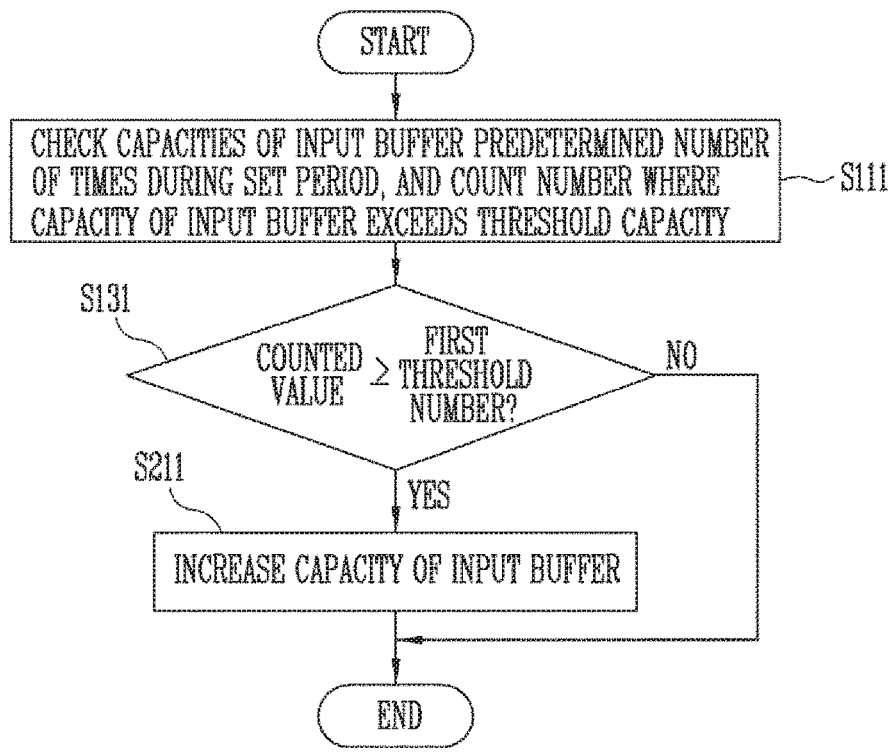
FIG. 11A is a flowchart illustrating an example of the operating method of the memory controller according to the present disclosure.
Figure 11B:
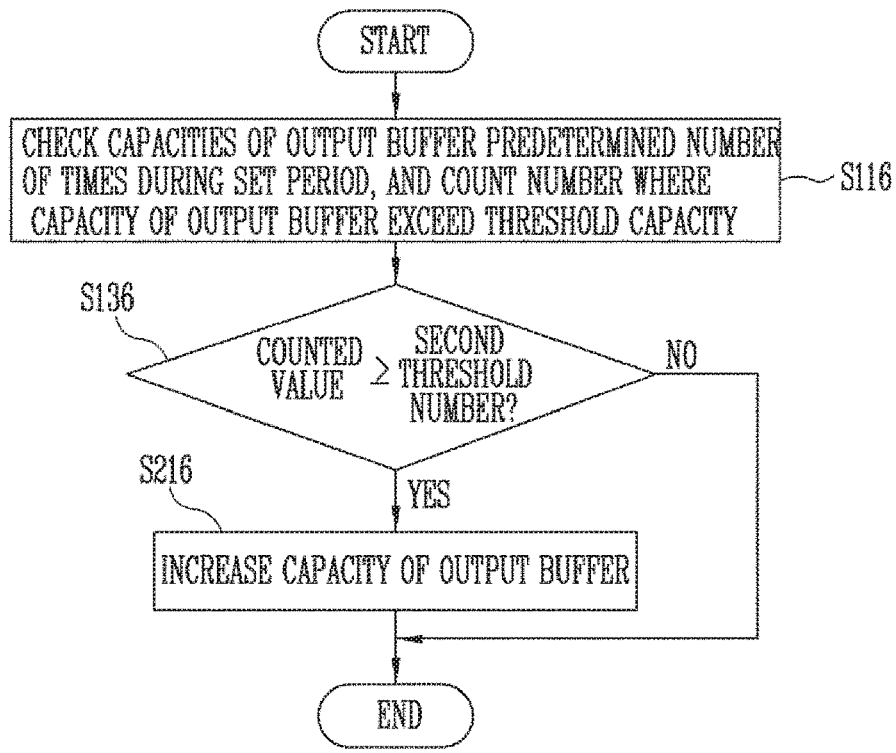
FIG. 11B is a flowchart illustrating another example of the operating method of the memory controller according to the present disclosure.

FIG. 11A is a flowchart illustrating an example of the operating method of the memory controller 1200 according to the present disclosure. FIG. 11B is a flowchart illustrating another example of the operating method of the memory controller 1200 according to the present disclosure. FIG. 11A illustrates an embodiment in which the capacity of the input buffer 411 is increased according to the usage of the input buffer 411, and FIG. 11B illustrates an embodiment in which the capacity of the output buffer 413 is increased according to the usage of the output buffer 413. Hereinafter, an operating method of the memory controller according to an exemplary embodiment of the present disclosure will be described with references to FIGS. 4, 11A, and 11B.

Referring to FIG. 11A, an operating method of the memory controller 1200 according to an exemplary embodiment of the present disclosure includes a step at step S111 of checking capacities of the input buffer a predetermined number of times during a set period and counting a number where the capacity of the input buffer exceeds a threshold capacity, and a step at step S131 of determining whether the counted value is greater than or equal to a predetermined first threshold number. The steps S111 and S131 may be steps included in the step S100 of FIG. 6.

In the step S110 of FIG. 8A, an input buffer capacity being currently used is checked. On the other hand, in the step S111 of FIG. 11A, capacities of the input buffer are checked several times during a certain period, and a number where the checked capacity exceeds the threshold capacity is counted. When the counted value is high, this means that the input buffer capacity being used in FIG. 7 frequently exceeds the threshold capacity. When the counted value is low, this means that the input buffer capacity does not frequently exceed the threshold capacity.

Accordingly, when the counted value is greater than or equal to the predetermined first threshold number in the step S131 (that is, "YES" at step S131), this means that the input buffer capacity being used frequently exceeds the threshold capacity, and thus the capacity of the input buffer is increased at step S211. The step S211 may be a step included in the step S200 of FIG. 6.

Meanwhile, when the counted value is smaller than the predetermined first threshold number in the step S131 (that is, "NO" at step S131), this means that the input buffer capacity being used does not frequently exceed the threshold capacity, and thus the process ends without increasing the capacity of the input buffer.

Specifically, in the step S111, the input buffer capacity being currently used is transferred in the form of buffer check data BMD shown in FIG. 4 to the buffer monitoring section 421. The buffer monitoring section 421 counts a number where the input buffer capacity being used exceeds the threshold capacity, by accumulating and analyzing buffer check data BMD during a certain period. The counted value is transferred as buffer analysis data ANL to the buffer capacity determining section 425.

In the step S131, the buffer capacity determining section 425 compares the counted value transferred as the buffer analysis data ANL with a threshold number. The threshold value storing section 423 transfers the threshold number as a threshold value THs to the buffer capacity determining section 425. When the counted value is larger than or equal to the threshold number, the buffer capacity determining section 425 generates a control signal CTR for increasing the capacity of the input buffer 411 and transfers the control signal CTR to the buffer memory 410. The position indicated by the buffer pointer is changed in response to the control signal CTR, so that the capacity of the input buffer 411 is increased.

When the counted value is smaller than the threshold number, the capacity of the input buffer 411 is not changed.

Referring to FIG. 11B, an operating method of the memory controller according to an exemplary embodiment of the present disclosure includes a step at step S116 of checking capacities of the output buffer a predetermined number of times during a set period and counting a number where the capacity of the output buffer exceeds a threshold capacity and a step at step S136 of determining whether the counted value is greater than or equal to a predetermined second threshold number. The steps S116 and S136 may be steps included in the step S100 of FIG. 6.

Meanwhile, the operating method of the memory controller according to the exemplary embodiment of the present disclosure further includes a step at step S216 of increasing the capacity of the output buffer 413 when the counted value is greater than or equal to the second threshold number as a result of the step S136 (that is, "YES at step S136). The step S216 may be a step included in the step S200 of FIG. 6.

When the counted value is smaller than the predetermined second threshold number in the step S136 (that is, "NO" at step S136), this means that the output buffer capacity being used does not frequently exceed the threshold capacity, and thus the process ends without increasing the capacity of the output buffer.

It will be understood that, as the steps S116, S136, and S216 are performed, the capacity of the output buffer 413 is changed similar to how the capacity of the input buffer 411 changed as described in FIG. 11A. Therefore, overlapping descriptions will be omitted.

Figure 12:
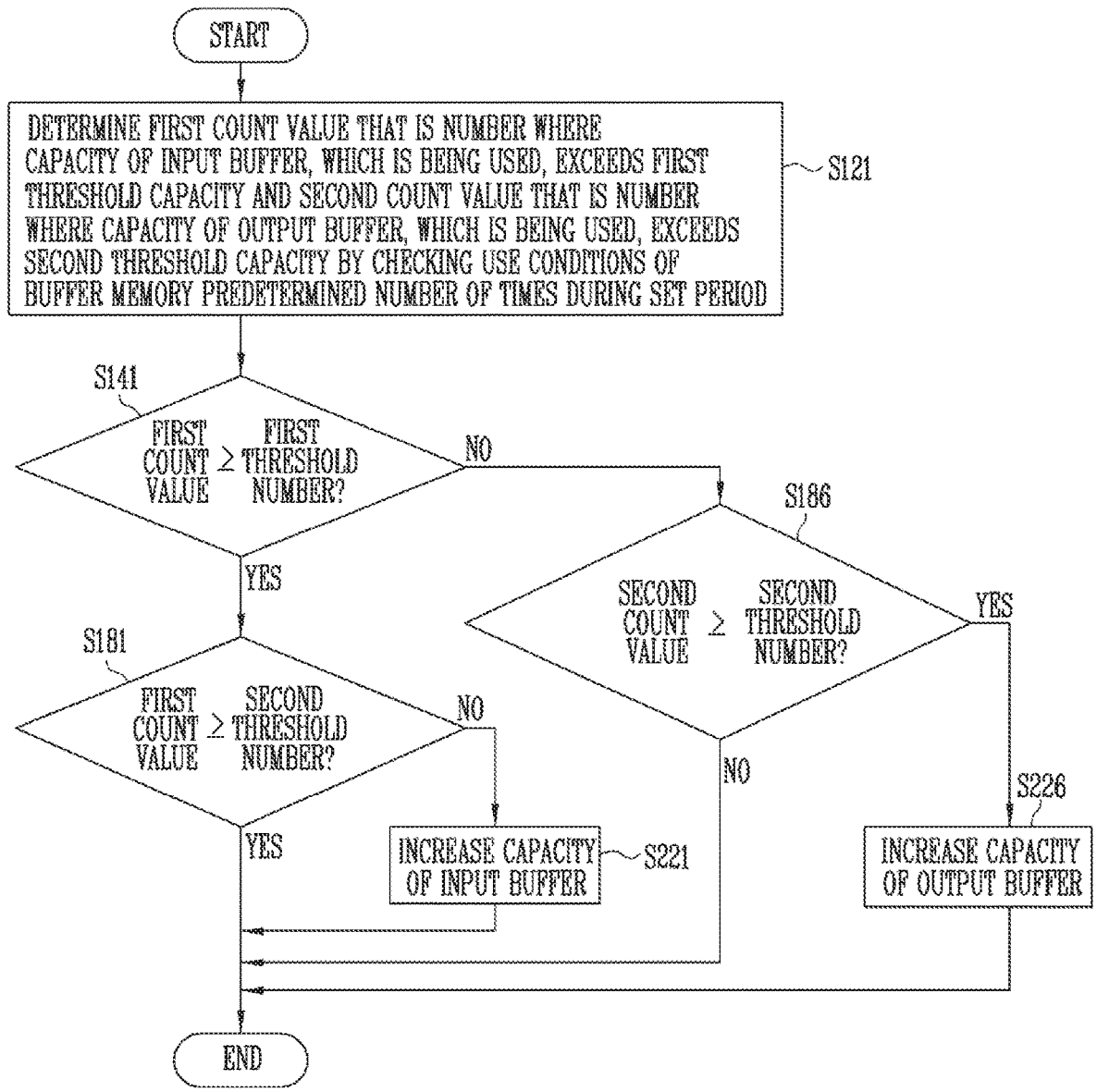
FIG. 12 is a flowchart illustrating an operating method of the memory controller according to still another embodiment of the present disclosure.

FIG. 12 is a flowchart illustrating an operating method of the memory controller 1200 according to still another embodiment of the present disclosure.

Referring to FIG. 12, at step S121, a first count value that is a number where a capacity of the input buffer, which is being used, exceeds a first threshold capacity and a second count value that is a number where a capacity of the output buffer, which is being used, exceeds a second threshold capacity are determined by checking use conditions of the buffer memory a predetermined number of times during a set period. Then, after determining the first count value and the second count value at step S121, it is first determined whether the first count value is greater than or equal to a first threshold number at step S141.

When the first count value is greater than or equal to the first threshold number (that is, "YES" at step S141), it is determined whether the second count value is larger than or equal to a second threshold number at step S181. When the second count value is greater than or equal to the second threshold number (that is, "YES" at step S181), this means that the capacity of the output buffer 413, which is being used, frequently exceeds the second threshold capacity. Accordingly, the process ends without increasing the capacity of the input buffer 411. When the second count value is smaller than the second threshold number (that is, "NO" at step S181), this means that the capacity of the output buffer 413, which is being used, does not frequently exceed the second threshold capacity. Accordingly, it is determined that the capacity of the output buffer 413 will be sufficient, and thus the capacity of the input buffer 411 is increased at step S221.

Meanwhile, when the first count value is smaller than the first threshold number as a result of the step S141 (that is, "NO" at step S141), this means that the capacity of the input buffer 411, which is being used, does not frequently exceed the first threshold capacity. Subsequently, it is determined whether the second count value is greater than or equal to the second threshold number at step S186.

When the second count value is greater than or equal to the second threshold number in a situation in which the capacity of the input buffer 411, which is being used, does not frequently exceed the first threshold capacity (that is, "YES" at step S186), the capacity of the output buffer 413 is increased at step S226. When the second count value is smaller than the second threshold number (that is, "NO" at step S186), the process ends without increasing the capacity of the output buffer 413.

In FIG. 12, it will be understood that the steps S121, S141, S181, and S186 are included in the step S100 of FIG. 6, and the steps S221 and S226 are included in the step S200 of FIG. 6.

According to the embodiment shown in FIG. 12, although the capacity of the input buffer 411, which is being used, frequently exceeds the first threshold capacity, it is determined whether the capacity of the input buffer 411 is to be increased according to a situation of the output buffer 413. Meanwhile, when the capacity of the input buffer 411, which is being used, does not frequently exceed the first threshold capacity, the capacity of the output buffer 413 is increased when the capacity of the output buffer 413, which is being used, frequently exceeds the second threshold capacity. Accordingly, the capacities of the input buffer 411 and the output buffer 413 can be changed by considering both use states of the input buffer 411 and the output buffer 413.

Figure 13A:
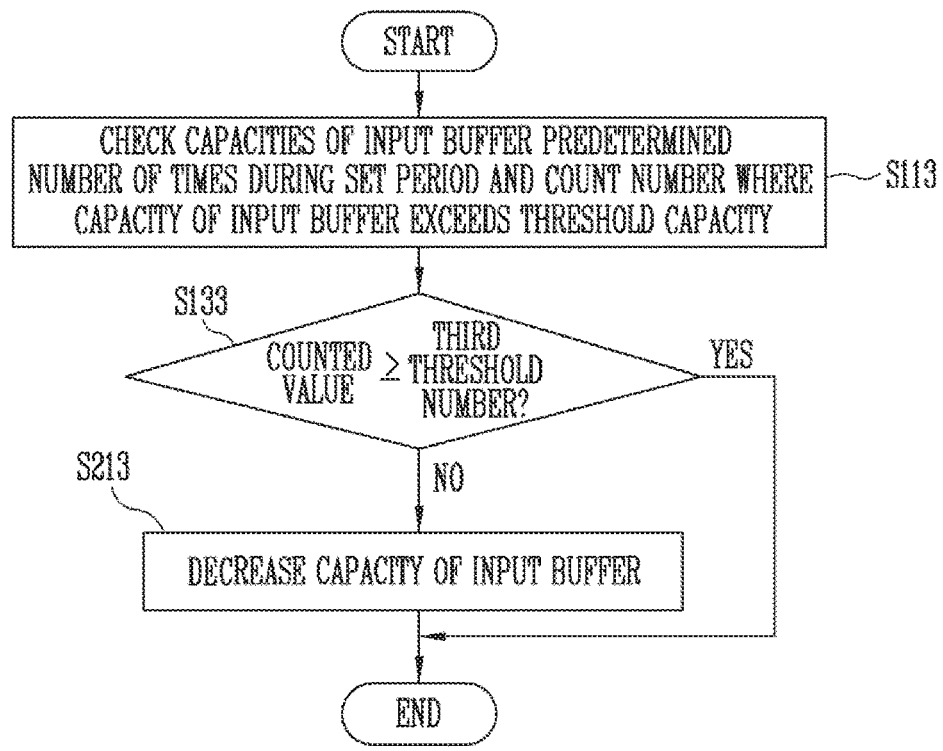
FIG. 13A is a flowchart illustrating an example of the operating method of the memory controller according to the present disclosure.
Figure 13B:
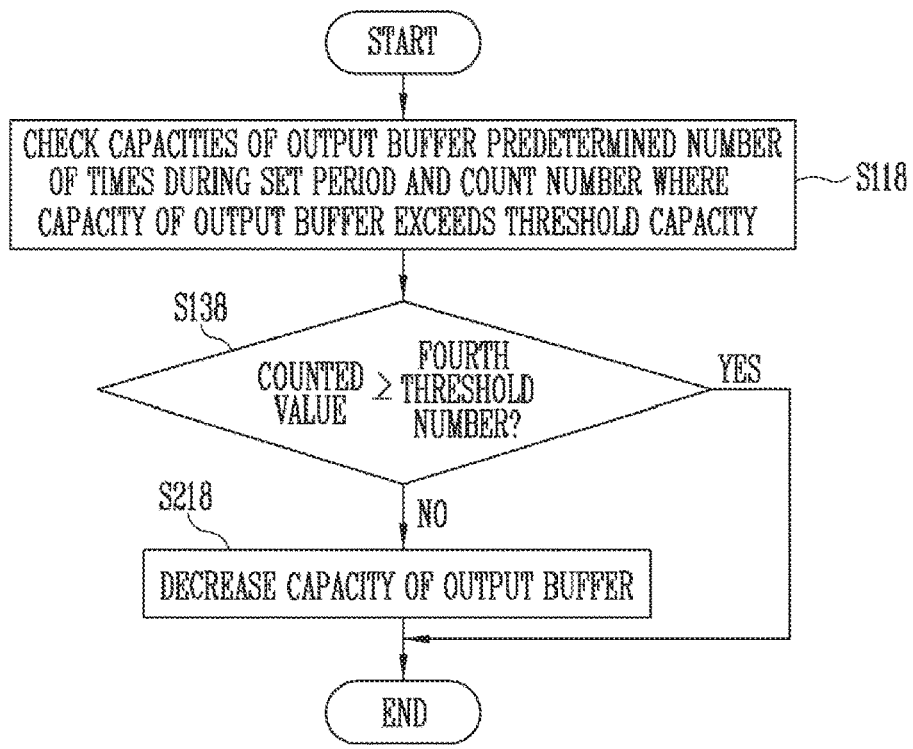
FIG. 13B is a flowchart illustrating another example of the operating method of the memory controller according to the present disclosure.

FIG. 13A is a flowchart illustrating an example of the operating method of the memory controller 1200 according to the present disclosure. FIG. 13B is a flowchart illustrating another example of the operating method of the memory controller 1200 according to the present disclosure. FIG. 13A illustrates an embodiment in which the capacity of the input buffer 411 is decreased according to the usage of the input buffer 411, and FIG. 13B illustrates an embodiment in which the capacity of the output buffer 413 is decreased according to the usage of the output buffer 413.

Referring to FIG. 13A, an operating method of the memory controller 1200 according to an exemplary embodiment of the present disclosure includes a step at step S113 of checking capacities of the input buffer 411 a predetermined number of times during a set period and counting a number where the capacity of the input buffer 411 exceeds a threshold capacity, and a step at step S133 of determining whether the counted value is smaller than a predetermined third threshold number. The steps S113 and S133 may be steps included in the step S100 of FIG. 6.

In the step S113 of FIG. 13A, the capacity of the input buffer 411 is checked several times during a certain period, and a number where the checked capacity exceeds the threshold capacity is counted. When the counted value is low, this means that the frequency at which the input buffer capacity being used in FIG. 7 exceeds the threshold capacity is low.

Accordingly, when the counted value is smaller than the predetermined third threshold number (that is, "NO" at step S133), this means that the frequency at which the input buffer capacity being used exceeds the threshold capacity is low, and thus the capacity of the input buffer 411 is decreased at step S213. The step S213 may be a step included in the step S200 of FIG. 6.

Meanwhile, when the counted value is greater than or equal to the predetermined third threshold number (that is, "YES" at step S133), this means that the input buffer capacity being used frequently exceeds the threshold capacity to a certain degree, and thus the process ends without decreasing the capacity of the input buffer 411.

Specifically, in the step S113, the input buffer capacity being currently used is transferred in the form of buffer check data BMD shown in FIG. 4 to the buffer monitoring section 421. The buffer monitoring section 421 counts a number where the input buffer capacity being used exceeds the threshold capacity, by accumulating and analyzing buffer check data BMD during a certain period. The counted value is transferred as buffer analysis data ANL to the buffer capacity determining section 425.

In the step S133, the buffer capacity determining section 425 compares the counted value transferred as the buffer analysis data ANL with the third threshold number. The threshold value storing section 423 transfers the third threshold number as a threshold value THs to the buffer capacity determining section 425. When the counted value is smaller than the third threshold number, the buffer capacity determining section 425 generates a control signal CTR for decreasing the capacity of the input buffer 411 and transfer the control signal CTR to the buffer memory 410. The position indicated by the buffer pointer is changed in response to the control signal CTR, so that the capacity of the input buffer 411 is decreased.

A value of the third threshold number may be variously determined, if necessary. As an example, when the third threshold number has a value of 1, it is determined whether the counted value is smaller than 1 in step S133. That is, in the step S133, when the counted value is 0, this means that the input buffer capacity being used has not exceeded the threshold capacity during the set period. Thus, the capacity of the input buffer is decreased at step S213.

When the counted value is greater than or equal to the third threshold number, the capacity of the input buffer 411 is not changed.

Referring to FIG. 13B, an operating method of the memory controller 1200 according to an exemplary embodiment of the present disclosure includes a step at step S118 of checking capacities of the output buffer 413 a predetermined number of times during a set period and counting a number where the capacity of the output buffer exceeds a threshold capacity, and a step at step S138 of determining whether the counted value is smaller than a predetermined fourth threshold number. The steps S118 and S138 may be steps included in the step S100 of FIG. 6.

Meanwhile, the operating method of the memory controller according to the exemplary embodiment of the present disclosure further includes a step at step S218 of decreasing the capacity of the output buffer 413 when the counted value is smaller than the fourth threshold number as a result of the step S138 (that is, "NO" at step S138). The step S218 is a step included in the step S200 of FIG. 6. When the counted value is greater than or equal to the fourth threshold number (that is, "YES" at step S138), this means that the output buffer capacity being used frequently exceeds the threshold capacity to a certain degree, and thus the process ends without decreasing the capacity of the output buffer 413.

It will be understood that, as the steps S118, S138, and S218 are performed, the capacity of the output buffer 413 is changed similarly to FIG. 13A.

Figure 14:
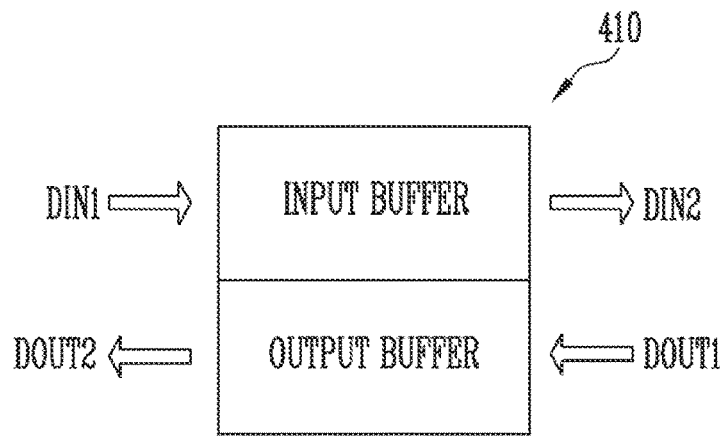
FIG. 14 is a diagram briefly illustrating data input/output to/from the buffer memory.

FIG. 14 is a diagram briefly illustrating data input/output to/from the buffer memory 410.

Referring to FIG. 14, input data DIN1 received from the main memory 400 is stored in the input buffer 411, and input data DIN2 output from the input buffer 411 is transferred to the data conversion circuit 440. In addition, output data DOUT1 received from the data conversion circuit 440 is stored in the output buffer 413, and output data DOUT2 output from the output buffer 413 is transferred to the main memory 400. Thus, the input data DIN1 received from the main memory 400 or the input data DIN2 output from the input buffer 411 is monitored, so that the entire data written to the memory device 1100 can be monitored. Further, the output data DOUT1 received from the data conversion circuit 440 or the output data DOUT2 output from the output buffer 413 is monitored, so that the entire data read from the memory device 1100 can be monitored.

According to the memory controller and the operating method thereof according to the embodiment of the present disclosure, the capacity of the input buffer or the output buffer of the buffer memory can be adjusted by monitoring data written to the memory device. Further, according to the memory controller and the operating method thereof according to the embodiment of the present disclosure, the capacity of the input buffer or the output buffer of the buffer memory can be adjusted by monitoring data read from the memory device.

For example, when the total capacity of the input data DIN1 or DIN2 transferred to the memory device 1100 exceeds a certain reference value, this means that the erase-write cycle (EW cycle) of the memory device 1100 has considerably progressed. The time required to write data to the memory device 1100 may increase, and therefore, a large capacity of the input buffer 411 may be required. According to the memory controller and the operating method thereof according to the embodiment of the present disclosure, the capacity of the input buffer or the output buffer can be determined by monitoring the total capacity of input/output data.

Figure 15A:
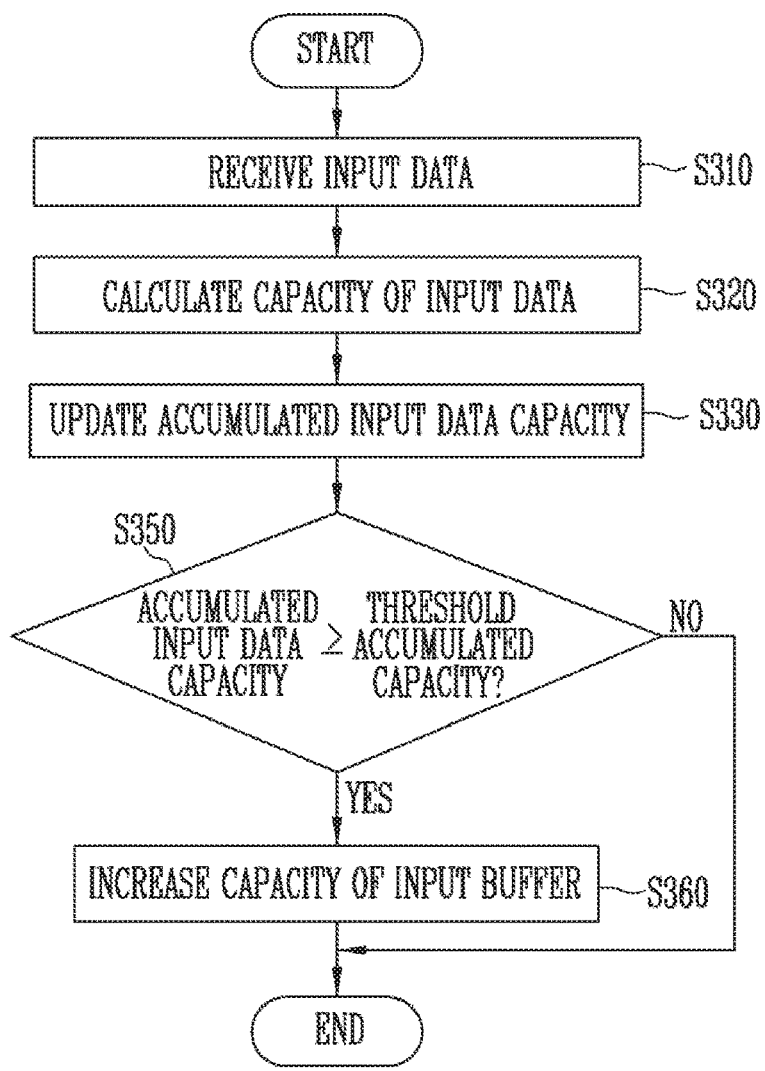
FIG. 15A is a flowchart illustrating an operating method of the memory controller according to still another embodiment of the present disclosure.

FIG. 15A is a flowchart illustrating an operating method of the memory controller according to still another embodiment of the present disclosure.

Referring to FIG. 15A, according to the operating method of the memory controller according to the embodiment of the present disclosure, input data is received at step S310. In the step S310, the input data DIN1 may be received from the main memory 400 to the input buffer 411 of the buffer memory 410. Subsequently, a capacity of the input data is calculated at step S320. In the step S320, the capacity of the input data may be calculated by the buffer monitoring section 421. Subsequently, an accumulated input data capacity is updated at step S330. The accumulated input data capacity may be a value representing the total sum of all data capacities that have been input to the input buffer 411. Whenever input data is received, the buffer monitoring section 421 of FIG. 4 may update the accumulated input data capacity. The updated accumulated input data capacity may be transferred as buffer analysis data ANL to the buffer capacity determining section 425.

Subsequently, it is determined whether the calculated accumulated input data capacity is larger than or equal to a threshold accumulated capacity at step S350. The threshold accumulated capacity may be transferred as a threshold value THs of FIG. 4 from the threshold value storing section 423 to the buffer capacity determining section 425. The buffer capacity determining section 425 compares the transferred accumulated input data capacity with the threshold accumulated capacity.

Subsequently, when the accumulated input data capacity is larger than or equal to the threshold accumulated capacity (that is, "YES" at step S350), the capacity of the input buffer 411 is increased at step S360. In the step S360, the buffer capacity determining section 425 generates a control signal CTR for increasing the capacity of the input buffer 411. The buffer memory 410 changes the address indicated by the buffer pointer in response to the control signal CTR, so that the capacity of the input buffer 411 is increased. When the accumulated input data capacity is smaller than the threshold accumulated capacity (that is, "NO" at step S350), the process ends without increasing the capacity of the input buffer 411.

The method of changing the capacity of the input buffer 411 by monitoring the input data DIN1 is illustrated in FIG. 15A. It will be understood that, in a similar method, the capacity of the output buffer 413 may be changed by monitoring the output data DOUT1.

FIG. 15B is a flowchart illustrating an operating method of the memory controller according to still another embodiment of the present disclosure.

Referring to FIG. 15B, according to the operating method of the memory controller according to the embodiment of the present disclosure, output data is received at step S410. In the step S410, the output data DOUT1 may be received from the data conversion unit 440 to the output buffer 413 of the buffer memory 410. Subsequently, a capacity of the output data is calculated at step S420. In the step S420, the capacity of the output data may be calculated by the buffer monitoring section 421. Subsequently, an accumulated output data capacity is updated at step S430. The accumulated output data capacity may be a value representing the total sum of all data capacities that have been input to the output buffer 413. Whenever output data is received, the buffer monitoring section 421 of FIG. 4 may update the accumulated output data capacity. The updated accumulated output data capacity may be transferred as buffer analysis data ANL to the buffer capacity determining section 425.

Subsequently, it is determined whether the calculated accumulated output data capacity is larger than or equal to a threshold accumulated capacity at step S450. The threshold accumulated capacity may be transferred as a threshold value THs of FIG. 4 from the threshold value storing section 423 to the buffer capacity determining section 425. The buffer capacity determining section 425 compares the transferred accumulated output data capacity with the threshold accumulated capacity.

Subsequently, when the accumulated output data capacity is larger than or equal to the threshold accumulated capacity (that is, "YES" at step S450), the capacity of the output buffer 413 is increased at step S460. In the step S460, the buffer capacity determining section 425 generates a control signal CTR for increasing the capacity of the output buffer 413. The buffer memory 410 changes the address indicated by the buffer pointer in response to the control signal CTR, so that the capacity of the output buffer 413 is increased. When the accumulated output data capacity is smaller than the threshold accumulated capacity (that is, "NO" at step S450), the process ends without increasing the capacity of the output buffer 413.

Figure 16:
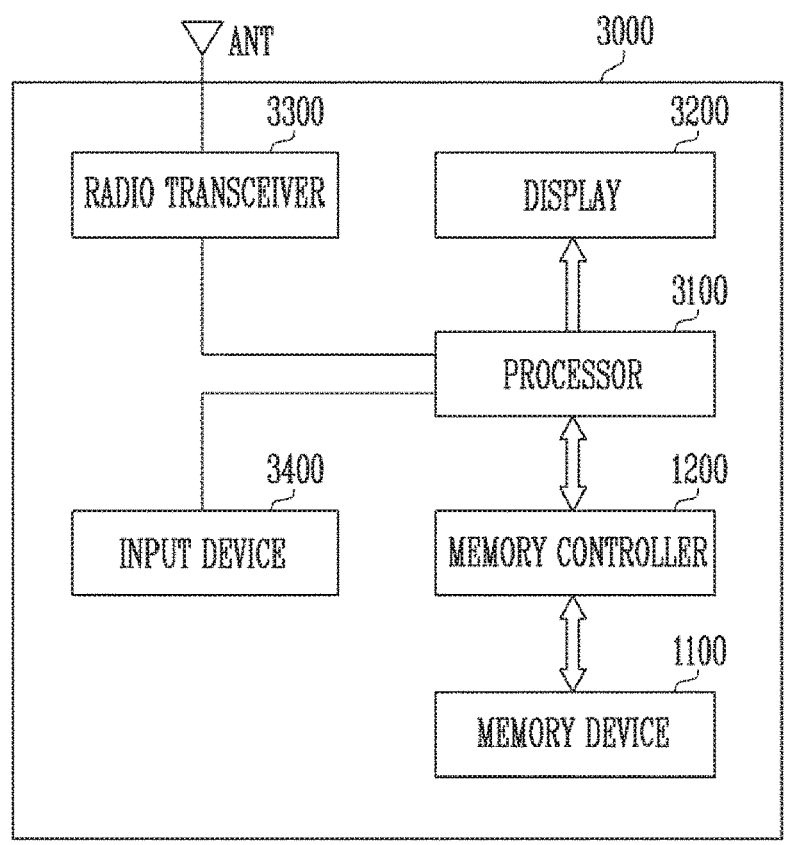
FIGS. 16 to 19 are diagrams illustrating various embodiments of the memory system including the memory controller shown in FIG. 3.

FIG. 16 is a diagram illustrating an embodiment of the memory system including the memory controller shown in FIG. 3.

Referring to FIG. 16, the memory system 3000 may be implemented as a cellular phone, a smart phone, a tablet PC, a personal digital assistant (PDA), or a wireless communication device. The memory system 3000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a processor 3100.

Data programmed in the memory device 1100 may be output through a display 3200 under the control of the memory controller 1200.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the memory device 1100. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In some embodiments, the memory controller 1200 capable of controlling an operation of the memory device 1100 may be implemented as a part of the processor 3100, or be implemented as a chip separate from the processor 3100.

Figure 17:
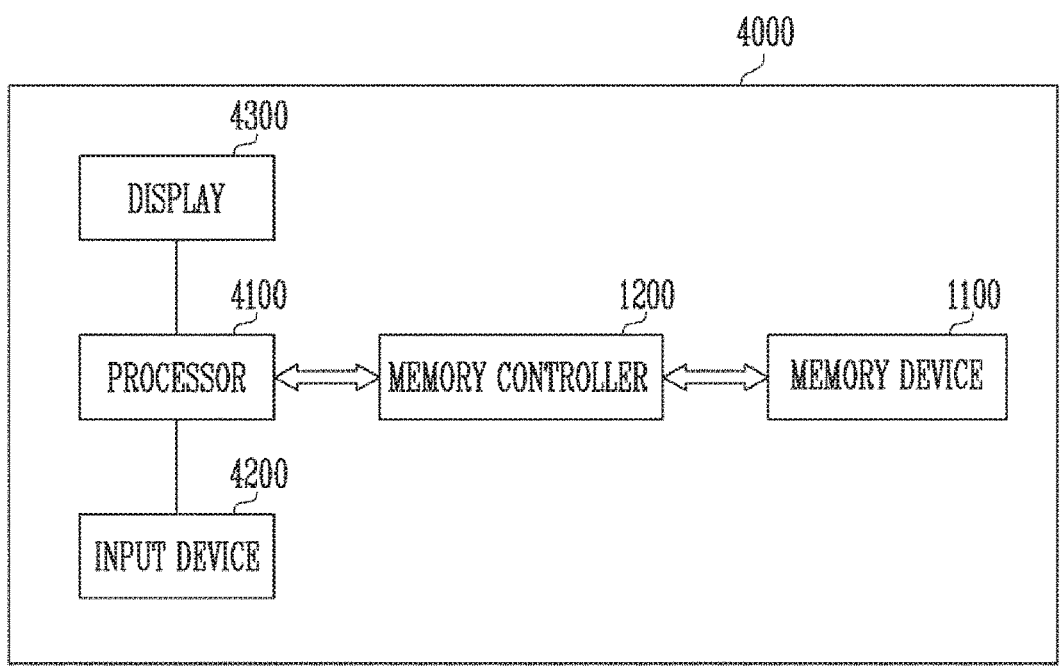

FIG. 17 is a diagram illustrating an embodiment of the memory system including the memory controller shown in FIG. 3.

Referring to FIG. 17, the memory system 4000 may be implemented as a personal computer (PC), a tablet PC, a net-book, an e-reader, a personal digital assistant (PDA), a portable multimedia player (PMP), an MP3 player, or an MP4 player.

The memory system 4000 may include a memory device 1100 and a memory controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 4000, and control an operation of the memory controller 1200. In some embodiments, the memory controller 1200 capable of controlling an operation of the memory device 1100 may be implemented as a part of the processor 4100, or be implemented as a chip separate from the processor 4100.

Figure 18:
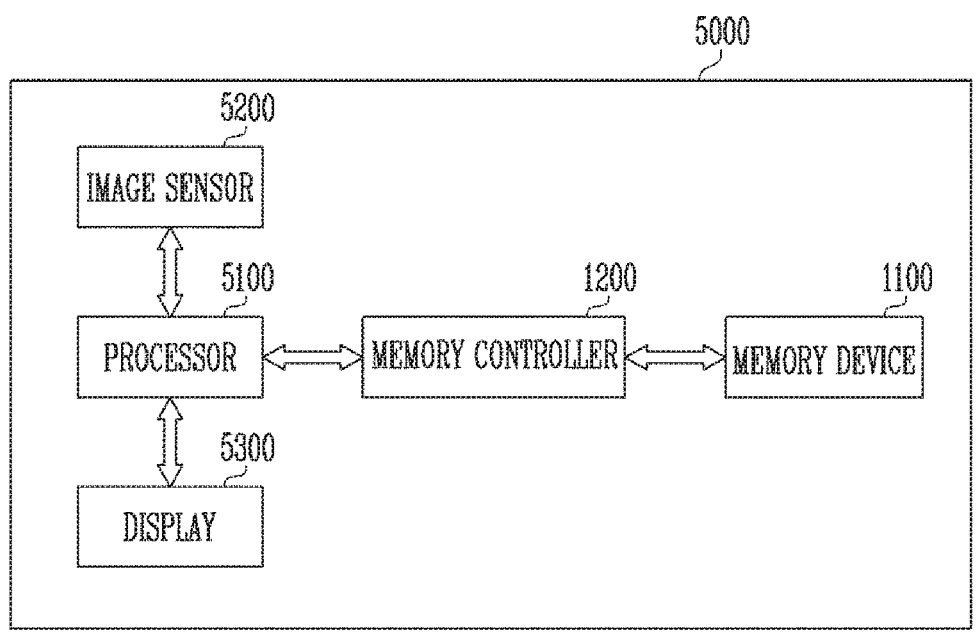

FIG. 18 is a diagram illustrating an embodiment of the memory system including the memory controller shown in FIG. 3.

Referring to FIG. 18, the memory system 5000 may be implemented as an image processing device, e.g., a digital camera, a mobile terminal having a digital camera attached thereto, a smart phone having a digital camera attached thereto, or a tablet PC having a digital camera attached thereto.

The memory system 5000 may include a memory device 1100 and a memory controller 1200 capable of controlling a data processing operation of the memory device 1100, e.g., a program operation, an erase operation, or a read operation.

An image sensor 5200 of the memory system 5000 may convert an optical image into digital signals, and the converted digital signals may be transmitted to a processor 5100 or the memory controller 1200. Under the control of the processor 5100, the converted digital signals may be output through a display 5300, or be stored in the memory device 1100 through the memory controller 1200. In addition, data stored in the memory device 1100 may be output through the display 5300 under the control of the processor 5100 or the memory controller 1200.

In some embodiments, the memory controller 1200 capable of controlling an operation of the memory device 1100 may be implemented as a part of the processor 5100, or be implemented as a chip separate from the processor 5100.

Figure 19:
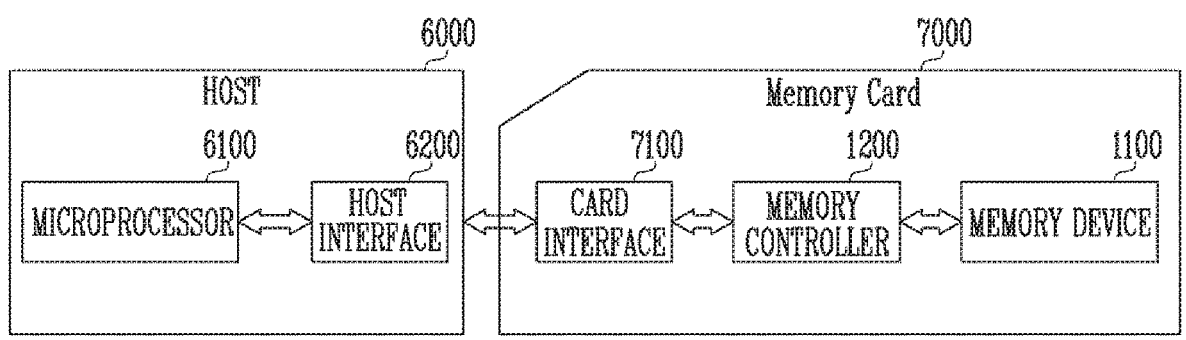

FIG. 19 is a diagram illustrating an embodiment of the memory system including the memory controller shown in FIG. 3.

Referring to FIG. 19, the memory system 7000 may be implemented as a memory card or a smart card. The memory system 7000 may include a memory device 1100, a memory controller 1200, and a card interface 7100.

The memory controller 1200 may control data exchange between the memory device 1100 and the card interface 7100. In some embodiments, the card interface 7100 may be a secure digital (SD) card interface or a multi-media card (MMC) interface, but the present disclosure is not limited thereto.

The card interface 7100 may interface data exchange between a host 6000 and the memory controller 1200 according to a protocol of the host 6000. In some embodiments, the card interface 7100 may support a universal serial bus (USB) protocol and an inter-chip (IC)-USB protocol. The card interface 7100 may mean hardware capable of supporting a protocol used by the host 6000, software embedded in the hardware, or a signal transmission scheme.

When the memory system 7000 is coupled to a host interface 6200 of the host 6000 such as a PC, a tablet PC, a digital camera, a digital audio player, a cellular phone, console video game hardware, or a digital set-top box, the host interface 6200 may perform data communication with the memory device 1100 through the card interface 7100 and the memory controller 1200 under the control of a microprocessor 6100.

According to the present disclosure, there can be provided a memory controller capable of more efficiently utilizing a buffer memory.

Further, according to the present disclosure, there can be provided an operating method of a memory controller capable of more efficiently utilizing a buffer memory.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller for controlling an operation of a memory device, the memory controller comprising:
   a buffer memory including an input buffer for storing input data received from a host and an output buffer for storing output data received from the memory device; and
   a buffer management circuit allocating capacities of the input buffer and the output buffer, based on a use state of at least one of the input buffer and the output buffer,
   wherein the buffer management circuit includes:
   a buffer monitoring circuit generating buffer analysis data according to a usage of the buffer memory;
   a threshold value storing circuit storing a threshold value for changing the capacities of the input buffer and the output buffer; and
   a buffer capacity determining circuit determining whether the allocated capacities of the input buffer and the output buffer are to be changed by comparing the buffer analysis data and the threshold value.

2. The memory controller of claim 1, wherein the buffer memory is configured as an SRAM.

3. The memory controller of claim 1,
   wherein the input buffer and the output buffer are divided by a buffer pointer indicating a specific address of the buffer memory,
   wherein the buffer management circuit allocates the capacities of the input buffer and the output buffer by changing the address indicated by the buffer pointer.

4. The memory controller of claim 3, wherein, in response to the capacity of any one of the input buffer and the output buffer being increased, the capacity of the other of the input buffer and the output buffer is decreased.

5. The memory controller of claim 1, wherein the buffer analysis data includes a capacity of the input buffer, which is being currently used, and the threshold value includes a first threshold capacity of the input buffer,
   wherein, in response to the capacity of the input buffer, which is being currently used, being larger than or equal to the first threshold capacity, the buffer capacity determining circuit determines that the capacity of the input buffer is to be increased.

6. The memory controller of claim 1, wherein the buffer analysis data includes a capacity of the output buffer, which is being currently used, and the threshold value includes a second threshold capacity of the output buffer,
   wherein, in response to the capacity of the output buffer, which is being currently used, being larger than or equal to the second threshold capacity, the buffer capacity determining circuit determines that the capacity of the output buffer is to be increased.

7. The memory controller of claim 1, wherein the buffer analysis data includes a first count value that is a number where the capacity of the input buffer, which is being used, exceeds a predetermined first threshold capacity, and the threshold value includes a predetermined first threshold number of the input buffer,
   wherein, in response to the first count value measured during a predetermined first period being greater than or equal to the first threshold number, the buffer capacity determining circuit determines that the capacity of the input buffer is to be increased.

8. The memory controller of claim 1, wherein the buffer analysis data includes a second count value that is a number where the capacity of the output buffer, which is being used, exceeds a predetermined second threshold capacity, and the threshold value includes a predetermined second threshold number of the output buffer,
   wherein, in response to the second count value measured during a predetermined first period being greater than or equal to the second threshold number, the buffer capacity determining circuit determines that the capacity of the output buffer is to be increased.

9. The memory controller of claim 1, wherein the buffer analysis data includes a first count value that is a number where the capacity of the input buffer, which is being used, exceeds a predetermined first threshold capacity, and the threshold value includes a predetermined third threshold number of the input buffer,
   wherein, in response to the first count value measured during a predetermined first period being smaller than the third threshold number, the buffer capacity determining circuit determines that the capacity of the input buffer is to be decreased.

10. The memory controller of claim 1, wherein the buffer analysis data includes a second count value that is a number where the capacity of the output buffer, which is being used, exceeds a predetermined second threshold capacity, and the threshold value includes a predetermined fourth threshold number of the output buffer,
    wherein, in response to the second count value measured during a predetermined first period being smaller than the fourth threshold number, the buffer capacity determining circuit determines that the capacity of the output buffer is to be decreased.

11. The memory controller of claim 1, wherein the buffer analysis data includes a total capacity of data that have been stored in the input buffer, and the threshold value includes a predetermined threshold accumulated capacity of the input buffer,
    wherein, in response to the total capacity being larger than or equal to the threshold accumulated capacity, the buffer capacity determining circuit determines that the capacity of the input buffer is to be increased.

12. The memory controller of claim 11, wherein the buffer monitoring circuit updates the total capacity whenever input data is stored in the input buffer.

13. The memory controller of claim 1, wherein the buffer analysis data includes a total capacity of data that have been stored in the output buffer, and the threshold value includes a predetermined threshold accumulated capacity of the output buffer,
    wherein, in response to the total capacity being larger than or equal to the threshold accumulated capacity, the buffer capacity determining circuit determines that the capacity of the output buffer is to be increased.

14. The memory controller of claim 1, wherein each of the input buffer and the output buffer is implemented in a First-In-First-Out (FIFO) structure.

15. A method for operating a memory controller for controlling an operation of a memory device, the method comprising:
    identifying capacities of an input buffer and an output buffer, which are being used, of a buffer memory in the memory controller;
    comparing the capacities of the input buffer and the output buffer with threshold capacities including a predetermined first threshold capacity and a predetermined second threshold capacity, respectively;
    generating count values including a first count value and a second count value; and adjusting the capacities of the input buffer and the output buffer, based on the count values, wherein the first count value is a number where the capacity of the input buffer exceeds the predetermined first threshold capacity, and wherein the second count value is a number where the capacity of the output buffer exceeds the predetermined second threshold capacity.

16. The method of claim 15, wherein the adjusting the capacities includes changing an address indicated by a buffer pointer for distinguishing the input buffer and the output buffer from each other.

17. The method of claim 15, wherein the adjusting the capacities includes:

determining whether the first count value is greater than or equal to a predetermined first threshold number, wherein, in the adjusting of the capacities of the input buffer and the output buffer, the capacity of the input buffer is increased in response to the first count value being greater than or equal to the first threshold number.

18. The method of claim 15, wherein the adjusting the capacities includes:

determining whether the second count value is greater than or equal to a predetermined second threshold number, wherein, in the adjusting of the capacities of the input buffer and the output buffer, the capacity of the output buffer is increased in response to the second count value being greater than or equal to the second threshold number.

* * * * *